United States Patent
Shimizu et al.

(10) Patent No.: US 9,444,086 B2
(45) Date of Patent: Sep. 13, 2016

(54) BATTERY UNIT AND SECONDARY BATTERY ASSEMBLY EQUIPPED WITH THE BATTERY UNIT

(75) Inventors: Hideo Shimizu, Nagano-ken (JP); Nagaaki Muro, Kanagawa-ken (JP); Masahiro Sekino, Tokyo (JP); Hidenori Miyamoto, Nagano-ken (JP); Mitsuhiro Saito, Saitama-ken (JP); Kenji Yazawa, Nagano-ken (JP); Toshinori Uchida, Nagano-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 681 days.

(21) Appl. No.: 12/879,460

(22) Filed: Sep. 10, 2010

(65) Prior Publication Data
US 2011/0076521 A1    Mar. 31, 2011

(30) Foreign Application Priority Data

Sep. 30, 2009   (JP) ................ P2009-228636

(51) Int. Cl.
| | |
|---|---|
| *H01M 2/20* | (2006.01) |
| *H01M 2/24* | (2006.01) |
| *H01M 2/26* | (2006.01) |
| *H01M 2/10* | (2006.01) |
| *H01M 10/42* | (2006.01) |

(52) U.S. Cl.
CPC .......... *H01M 2/204* (2013.01); *H01M 2/1061* (2013.01); *H01M 2/20* (2013.01); *H01M 2/202* (2013.01); *H01M 2/24* (2013.01); *H01M 2/26* (2013.01); *H01M 2/266* (2013.01); *H01M 10/425* (2013.01)

(58) Field of Classification Search
CPC .... H01M 2/0245; H01M 2/20; H01M 2/202; H01M 2/266

USPC ........... 429/7, 148–149, 152–155, 158, 161, 429/163, 123; 439/500, 510
See application file for complete search history.

(56) References Cited

U.S. PATENT DOCUMENTS 6,211,646 B1* 4/2001 Kouzu et al. ............... 320/107
2002/0182480 A1* 12/2002 Hanauer et al. .............. 429/62
(Continued)

FOREIGN PATENT DOCUMENTS

| JP | 55-169062 U | 12/1980 |
|---|---|---|
| JP | 59-86666 U | 6/1984 |

(Continued)

OTHER PUBLICATIONS

U.S. Appl. No. 12/680,589, filed Jul. 7, 2010, Nagaaki Muro, et al.
(Continued)

*Primary Examiner* — Basia Ridley
*Assistant Examiner* — James Erwin
(74) *Attorney, Agent, or Firm* — Oblon, McClelland, Maier & Neustadt, L.L.P

(57) ABSTRACT

According to one embodiment, a battery unit includes a first cell unit, a second cell unit and a third cell unit arranged adjacent to the first cell unit, respectively. Each cell unit includes a plurality of secondary battery cells, and the respective secondary battery cells are formed of a main body of a substantially rectangular solid shape and a pair of first and second electrodes of different polarities each other pulled out from one end of the main body. A first bus bar connects the first electrodes of the first cell unit and the second electrodes of the second cell unit in a first line, and a second bus bar connects the second electrodes of the first cell unit and the first electrodes of the third cell unit in a second line.

9 Claims, 23 Drawing Sheets

(56) References Cited

U.S. PATENT DOCUMENTS

| | | |
|---|---|---|
| 2005/0031945 A1* | 2/2005 | Morita et al. ............. 429/158 |
| 2007/0015050 A1* | 1/2007 | Jung et al. ............... 429/152 |
| 2008/0124617 A1 | 5/2008 | Bjork |
| 2008/0280194 A1* | 11/2008 | Okada ........................ 429/99 |

FOREIGN PATENT DOCUMENTS

| | | |
|---|---|---|
| JP | 60-147159 U | 9/1985 |
| JP | 6-33358 U | 4/1994 |
| JP | 2000-340195 A | 12/2000 |
| JP | 2001-291533 A | 10/2001 |
| JP | 2003-162993 A | 6/2003 |
| WO | WO 2009/041018 A1 | 4/2009 |

OTHER PUBLICATIONS

Office Action issued Jan. 7, 2014 in Japanese Patent Application No. 2009-228636 (submitting English language translation only).

* cited by examiner

BATTERY UNIT AND SECONDARY BATTERY ASSEMBLY EQUIPPED WITH THE BATTERY UNIT

This application is based upon and claims the benefit of priority from prior Japanese Patent Application No. 2009-228636, filed Sep. 30, 2009, the entire contents of which are incorporated herein by reference.

FIELD

Embodiments described herein relate generally to a battery unit including a plurality of secondary battery cells and a secondary battery assembly equipped with the battery units.

BACKGROUND

In recent years, secondary batteries have been widely used as power suppliers to an electric vehicle, a hybrid electric vehicle, and a battery-assisted bicycle, or power suppliers to electric assemblies. For example, since a rechargeable lithium-ion battery, for example, a nonaqueous secondary battery has a high output and a high energy density characteristics, the rechargeable lithium-ion battery attracts attention as power supplies to the electric vehicle.

Generally, the secondary battery is constituted as a cell equipped with an exterior container formed in a shape of a flat rectangular box made from aluminum etc., a group of electrodes contained with an electrolyte in the exterior container, and electrode terminals formed in the exterior container and connected to the group of electrodes.

A battery unit, in which a plurality of cells are arranged side by side in a case and connected in parallel or in series in order to attain a high capacity and a high power characteristics, is used. Furthermore, a secondary battery assembly in which an electric circuit is equipped in the battery unit is also used. For example, as disclosed in Japanese patent application Laid Open No. H7-237457, an exterior case of such secondary battery assembly is constituted by two or more firm frames which bundle, hold or support the cells, or by a firm exterior case which covers all the cell groups.

However, in the above secondary battery assembly, when the frames and the exterior case are formed of firm metals, such as steel, the secondary battery assembly tends to become heavy. Furthermore, since there are many chances to centralize strength to bind the battery units, a connecting portion is grown in size, and the assembly process becomes complicated. For example, in the electric vehicle etc., when aiming at a damage reduction of roads or an improvement in continuous driving mileage, a miniaturization and a high density package of the secondary battery assembly have been a big issue.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Figure 1:
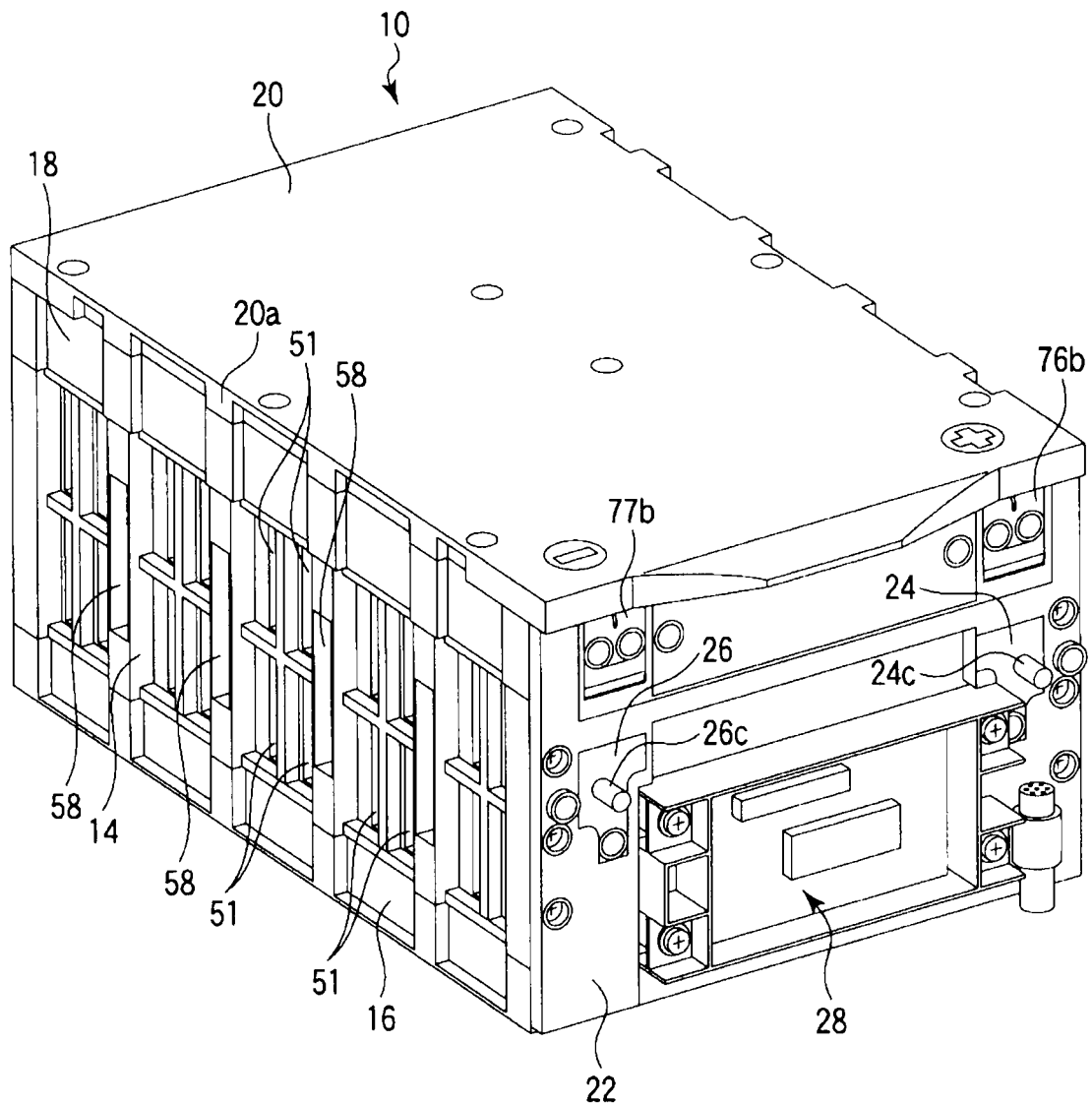
FIG. 1 is a perspective view showing a secondary battery assembly according an embodiment of the present invention.

A battery unit and a secondary battery assembly equipped with the battery units according to an exemplary embodiment of the present invention will now be described with reference to the accompanying drawings wherein the same or like reference numerals designate the same or corresponding parts throughout the several views.

According to an embodiment, a battery unit includes: a first cell unit, a second cell unit and a third cell unit arranged adjacent to the first cell unit, respectively, each cell unit including a plurality of secondary battery cells, and the respective secondary battery cells being formed of a main body of a substantially rectangular solid shape and a pair of first and second electrodes of different polarities each other pulled out from one end of the main body; a first bus bar to connect the first electrodes of the first cell unit and the second electrodes of the second cell unit in a first line; and a second bus bar to connect the second electrodes of the first cell unit and the first electrodes of the third cell unit in a second line.

According to another embodiment, a secondary battery assembly, includes: first and second battery units arranged in parallel, each including, a first cell unit, a second cell unit and a third cell unit arranged adjacent to the first cell unit, respectively, each cell unit including a plurality of secondary battery cells, and the respective secondary battery cells being formed of a main body of a substantially rectangular solid shape and a pair of first and second electrodes of different polarities each other pulled out from one end of the main body; a first bus bar to connect the first electrodes of the first cell unit and the second electrodes of the second cell unit in a first line; and a second bus bar to connect the second electrodes of the first cell unit and the first electrodes of the third cell unit in a second line arranged in parallel with the first line, a bus bar unit to connect between the first electrodes of the battery cells forming a first cell unit in the first battery unit, and second electrodes of the battery cells forming the second cell unit in the second battery unit, and a case to accommodate the first and second battery units.

Figure 2:
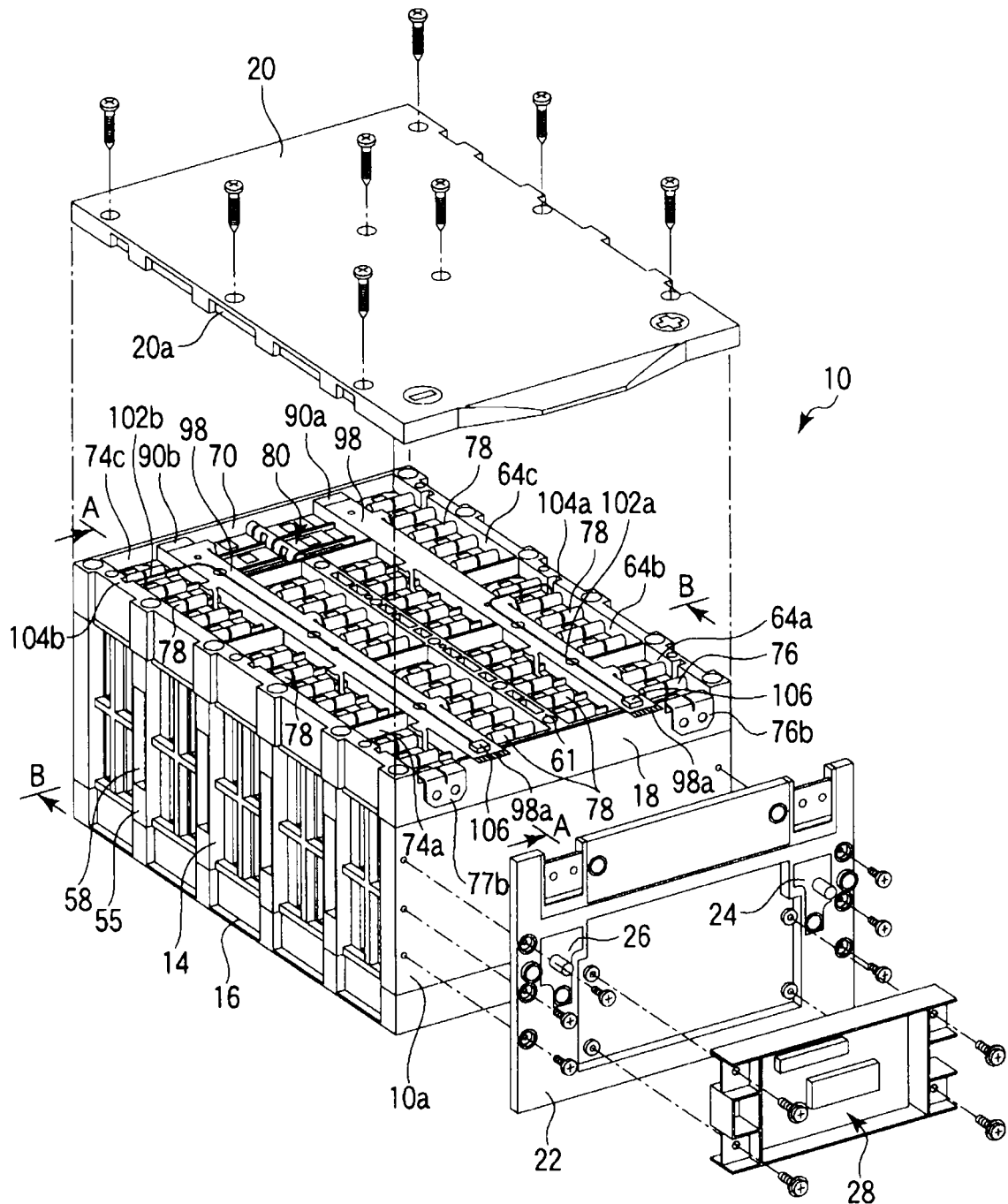
FIG. 2 is an exploded perspective view showing the secondary battery assembly shown in FIG. 1 by disassembling a case, a top cover, and a terminal base.
Figure 3:
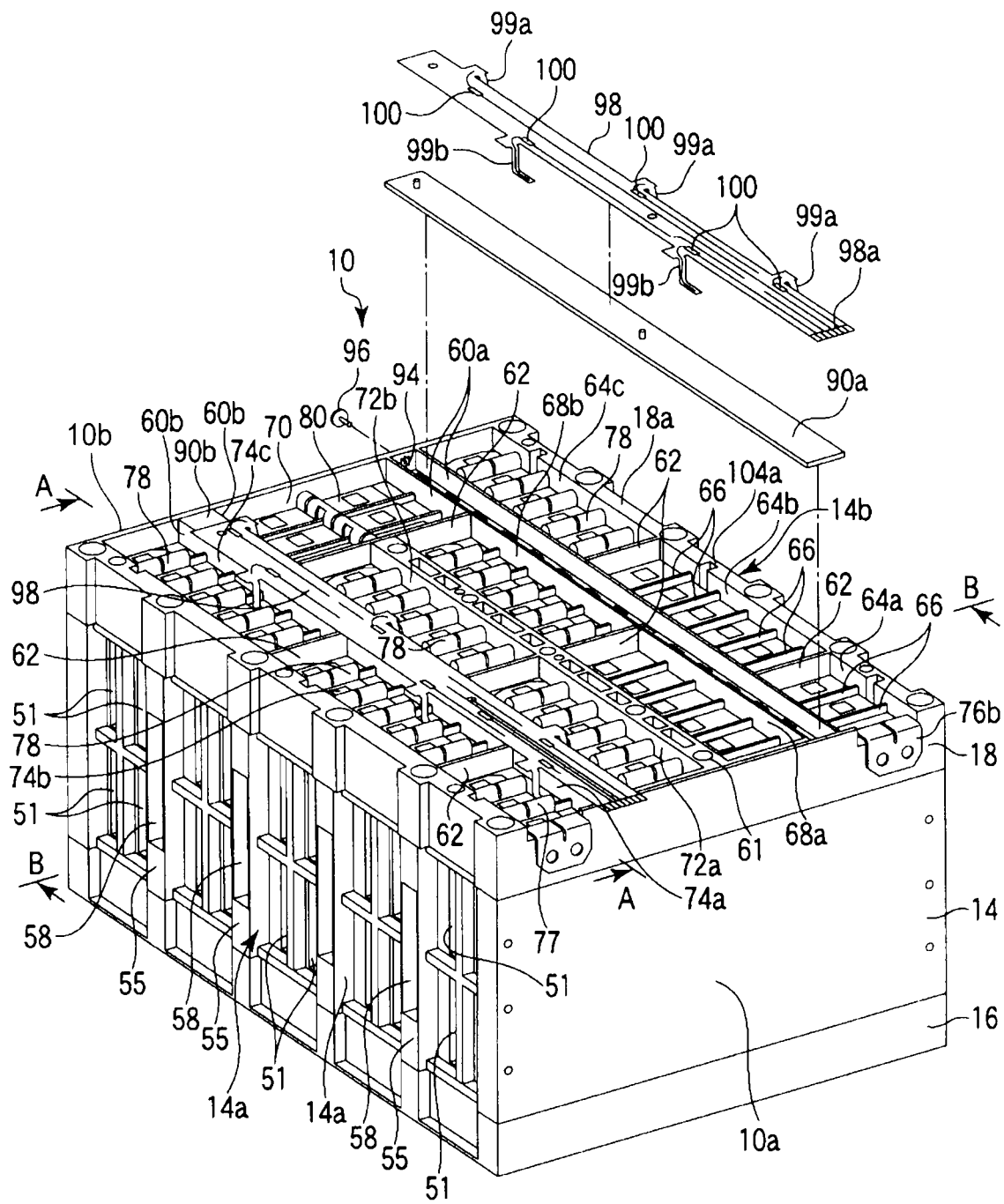
FIG. 3 is an exploded perspective view showing the secondary battery assembly shown in FIG. 1 by removing the top cover.
Figure 4:
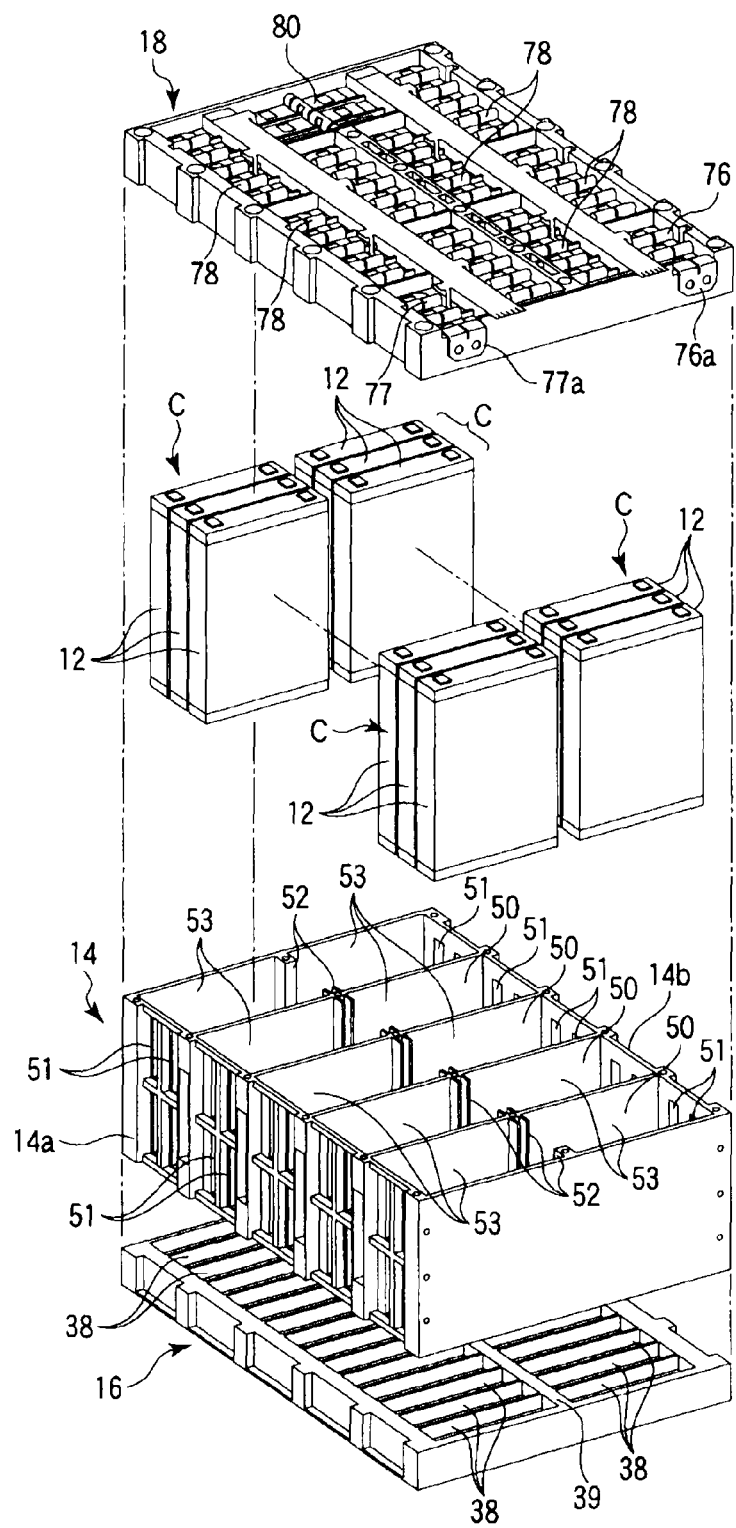
FIG. 4 is an exploded perspective view showing the secondary battery assembly shown in FIG. 1 by disassembling the case and cell units.

FIG. 1 is a perspective diagram showing an exterior view of a secondary battery assembly, and FIG. 2 is an exploded perspective view showing a construction for fixing a buss bar of the secondary battery assembly by removing a top caver. FIG. 3 is an exploded perspective view showing the secondary battery assembly shown in FIG. 1 by removing the top cover and a FPC. FIG. 4 is an exploded perspective view showing the secondary battery assembly shown in FIG. 1 by disassembling the case and the cell unit.

As shown in FIGS. 1 to FIG. 4, the secondary battery assembly is equipped with a plurality of secondary battery cells 12, for example, thirty cells accommodated in a rectangular box-like case 10, which thereby constitute battery units. The case 10 includes three case components, that is, a rectangular frame-like center case 14 in which upper and lower sides open, a lower case 16 constituting a bottom wall formed in a shape of a rectangular board, and an upper case 18 formed in a shape of a rectangular board constituting a ceiling wall. The rectangular box-like case 10 is constituted by joining the lower case 16, the center case 14, and the upper case 18 in this order. The upper surface side of the upper case 18 is covered with a rectangular board-like top cover 20. Each of the case components and the top cover 20 of the case 10 are respectively formed of an insulating synthetic resin, for example, such as PPE (polyphenylether).

A terminal base 22 of a shape of a rectangular board formed of the synthetic resin is fixed at a side wall 10a located in an end side of a longitudinal direction of the case 10, for example, a front end wall using screws. An anode output terminal 24 and a cathode output terminal 26 of the secondary battery assembly, and a checking board 28 to check a voltage or temperature etc. of the cell 12 are fixed to the terminal base 22.

Figure 5:
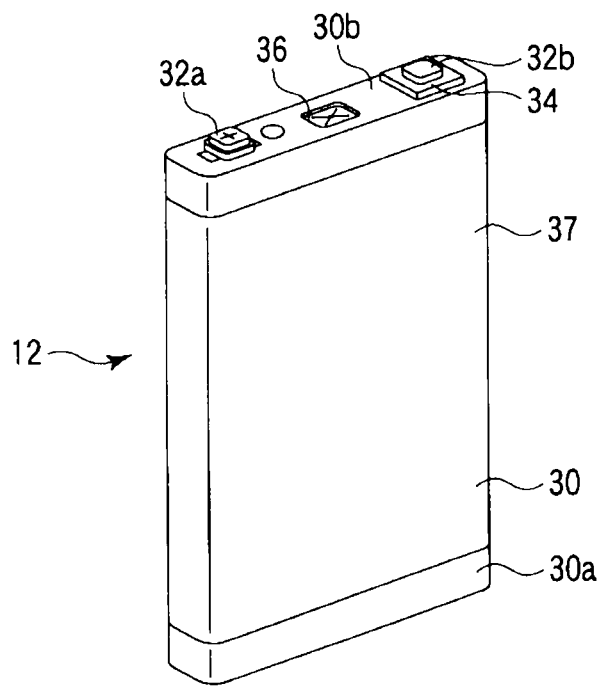
FIG. 5 is a perspective view showing a battery cell.
Figure 6:
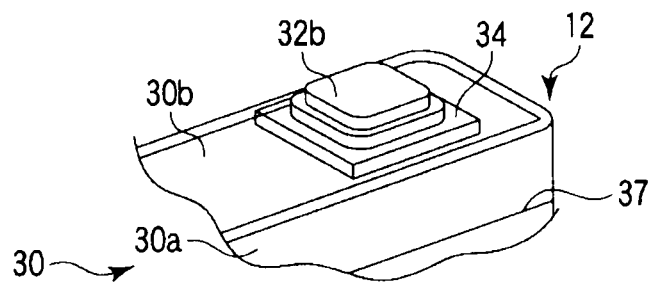
FIG. 6 is a perspective view showing one electrode terminal portion of the battery cell by expanding.
Figure 7:
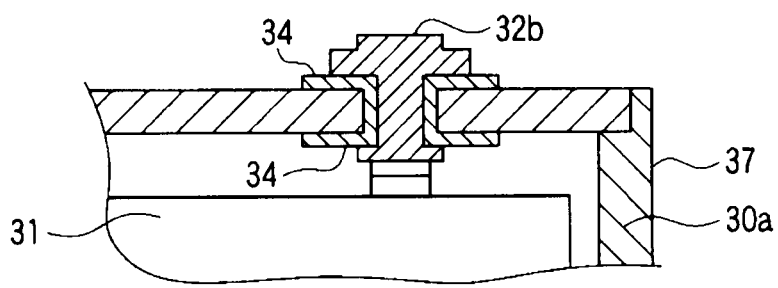
FIG. 7 is a sectional view showing one electrode terminal portion of the battery cell by expanding.

As shown in FIGS. 5 to FIG. 7, each cell 12 is formed of a nonaqueous electrolyte secondary battery, such as a lithium-ion battery, and includes an exterior container 30 of a flat and approximately rectangular shape made of aluminum or aluminum alloy, and an electrode part 31 contained with the nonaqueous electrolyte solution in the exterior container 30. The exterior container 30 includes a main body 30a opened to outside at a topside and a rectangular tabular lids 30b welded to the main body 30a of the exterior container 30 so as to cover the opening and seal in a liquid-tight manner. For example, the electrode part 31 is made by winding an anode plate and a cathode plate spirally with a separator therebetween, and by compressing the stacked plates in the radius direction. Thereby, the electrode part 31 is formed in a rectangular flat shape.

The anode terminal 32a and the cathode terminal 32b are formed respectively at both ends of the lid 30b in a longitudinal direction, and projected from the lid 30b. The anode terminal 32a and the cathode terminal 32b are connected to the anode and the cathode of the electrode part 31, respectively. One electrode terminal, for example, the anode terminal 32a is electrically connected to the lid 30b, thereby the potential of the anode terminal 32a is the same as the exterior container 30. The cathode terminal 32b penetrates and extends in the lid 30b. A sealing material 34, for example, a gasket consisting of insulating material such as synthetic resin and glass is formed between the cathode terminal 32b and the lid 30b. The gasket 34 not only seals the cathode terminal 32b in a liquid-tight manner but electrically isolates between the cathode terminal 32b and the exterior containers 30, and prevents short circuit therebetween. Moreover, the gasket 34 extends to outside from entire circumference of the cathode terminal 32b at the upper surface side of the lid 30b.

As shown in FIG. 5, a rectangular safety valve 36 is formed, for example, in the central portion of the lid 30b. The safety valve 36 is formed of a thin-walled part that is made thin in a thickness for about one half in the part of the lid 30, and stamps are formed in an upper surface of the central part of the thin-walled part. When gas is emitted in the exterior container 30 by an extraordinary mode of the cell 12 and the pressure rises in the exterior container 30 beyond a predetermined value, the safety valve 36 opens. Accordingly, the inside pressure is lowered, and a burst of the exterior container 30 is prevented.

Around the main body 30a of the container 30, an insulating film 37 is surrounded except for upper and lower end portions of the container 30. The film 37 prevents the short circuit between the exterior container 30 and other cells 12, or the short circuit between the exterior container 30 and other components while regulating an expansion of the exterior container 30.

As shown in FIG. 4, the cell 12 is grouped by connecting two or more cells 12, for example, three cells in parallel, thereby making one cell unit C. Then, ten cell units C are connected in series. The arrangement of the cells 12 and the electric connection structure are explained in detail later.

As shown in FIG. 4, thirty engaging slots 38 are formed in the inside of the lower case 16 corresponding to the number of the cells 12. Each engaging slot 38 is formed in a long and slender rectangular shape corresponding to the cross-sectional form of the exterior container 30 of the cell 12, and extends along a width direction of the lower case 16.

The engaging slots 38 are arranged in two rows in the longitudinal direction of the lower case 16 so that the two rows of the engaging slots 38 are apart from each other with a predetermined interval. A center rib 39 is formed between the two rows, and extends for full length of the lower case 16 in the longitudinal direction.

In the center case 14, four partition walls 50 are formed integrally. The partition walls 50 extend for the full length in the width direction of the center case 14, respectively and arranged at a regular interval in the longitudinal direction of the center case 14. The inside of the center case 14 is divided into five spaces by the partition walls 50. Furthermore, support posts 52 extending in a height direction of the center case 14 are formed in a central portion of the respective partition walls 50 and both-end walls in the longitudinal direction of the center case 14. Each of the spaces within the center case 14 is divided into two groups of accommodation rooms 53 by the support post 52. Thereby, in the center case 14, ten accommodation rooms 53 in which one cell unit C is accommodated in the respective accommodation rooms are formed along with the two rows.

As shown in FIG. 3 and FIG. 4, a plurality of vents 51 are formed in two side walls 14a and 14b extending in the longitudinal direction of the center case 14, respectively. For example, four vents 51 are formed corresponding to one accommodation room 53, and communicated with the accommodation room 53, respectively. Air for cooling can be ventilated in the case 10 by the vents 51.

A plurality of ribs 55 extending in the height direction in the side walls 14a and 14b of the center case 14 are respectively formed integrally. The support ribs 55 are formed at both ends of the side walls 14a and 14b in the longitudinal direction, and at opposing positions to respective partition walls 50 of the side walls 14a and 14b. A positioning concave portion 58 extending in the height direction of the center case 14 is formed in the support ribs 55. When arranging the secondary battery assembly in a desired setting position, the case 10 can be positioned by engaging of clutch of a positioning convex portion prepared in the installation side to the positioning concave portion 58 of the case 10.

Figure 8:
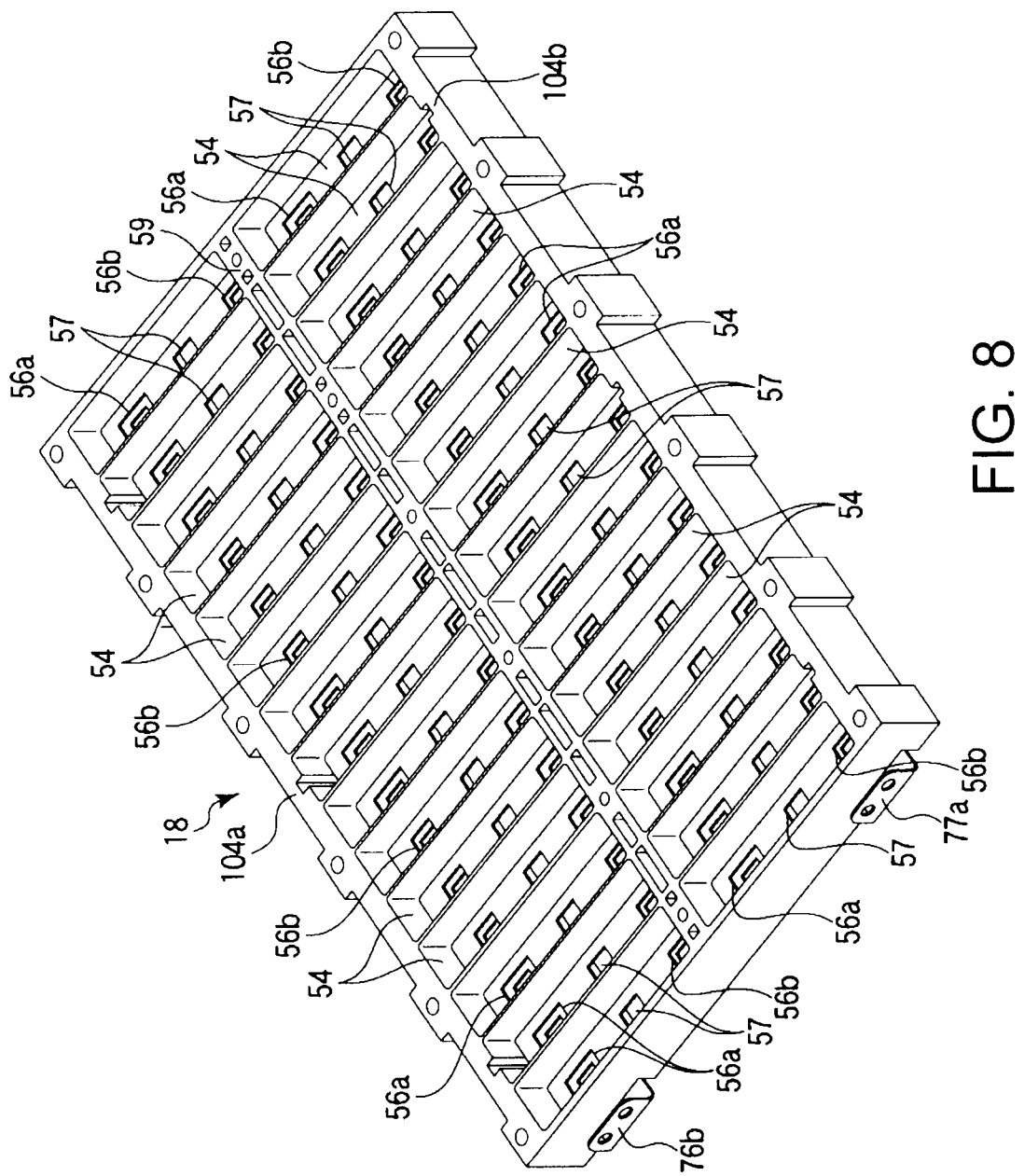
FIG. 8 is a perspective view showing an inside of an upper case constituting the case.

As shown in FIG. 8, thirty engaging slots 54 are formed in the inside of the upper case 18 corresponding to the number of the cells 12. Each engaging slot 54 is formed in a long and slender rectangular shape corresponding to the cross-sectional form of the exterior container 30 of the cell 12, and extends along the width direction of the upper case 18. A plurality of engaging slots 54 are arranged in two rows in the longitudinal direction of the upper case 18 so that the two rows of the engaging slots 54 are apart from each other with a predetermined interval. The center rib 59 is formed between the two rows, and extends for full length of the upper case 18 in the longitudinal direction.

In the upper case 18, apertures 56a and 56b of a rectangular shape corresponding to the anode terminal 32a and the cathode terminal 32b of the cell 12 are formed in the bottom of each engaging slot 54, and exhaust apertures 57 which counter the safety valves of the respective cells 12 are further formed in the bottom. The apertures 56a and 56b are located in the both ends of the engaging slot 54, and the exhaust aperture 57 is located in the middle between the apertures 56a and 56b. In the embodiment, the anode terminal 32a of the cell 12 is formed larger than the cathode terminal 32b. Corresponding to the size of the terminal, the aperture 56a for penetrating the anode terminal 32a is also formed larger than the aperture 56b which penetrates the cathode terminal 32b.

The lower case 16 is screwed and fixed to an undersurface side of the center case 14, and constitutes a bottom wall of the case 10. The upper case 18 is screwed and fixed to an upper surface side of the center case 14, and constitutes a ceiling wall of the case 10. The center case 14 is joined between the lower case 16 and the upper case 18 which face each other.

Figure 9:
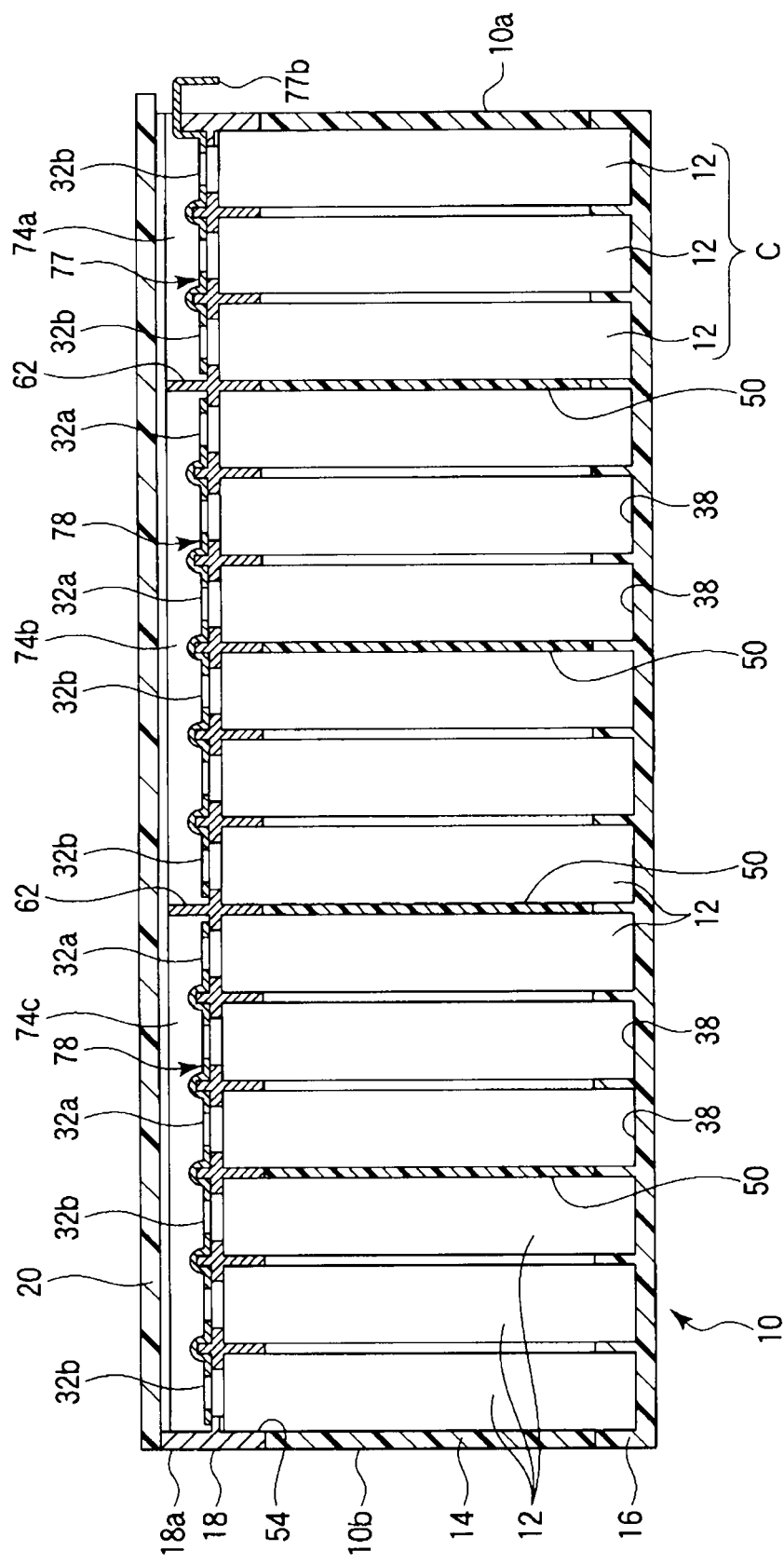
FIG. 9 is a cross-sectional view of the secondary battery assembly taken along line A-A of FIG. 3.
Figure 10:
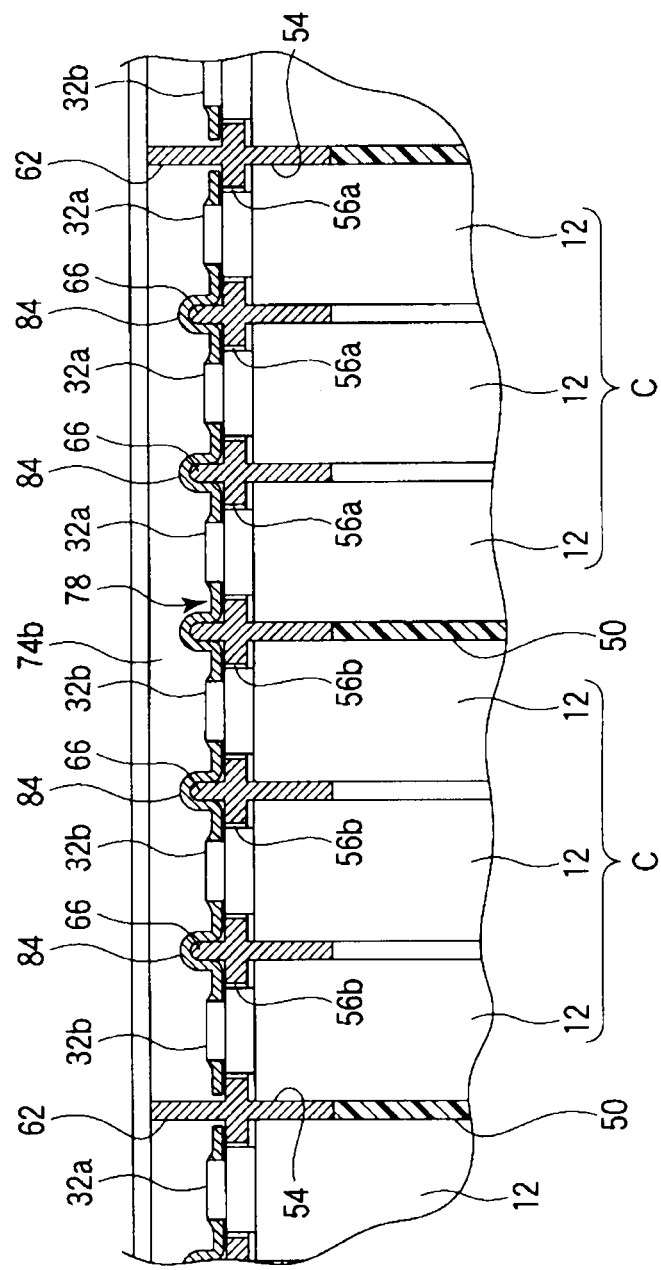
FIG. 10 is a cross-sectional view showing a portion of the secondary battery assembly shown in FIG. 9 by expanding.
Figure 11:
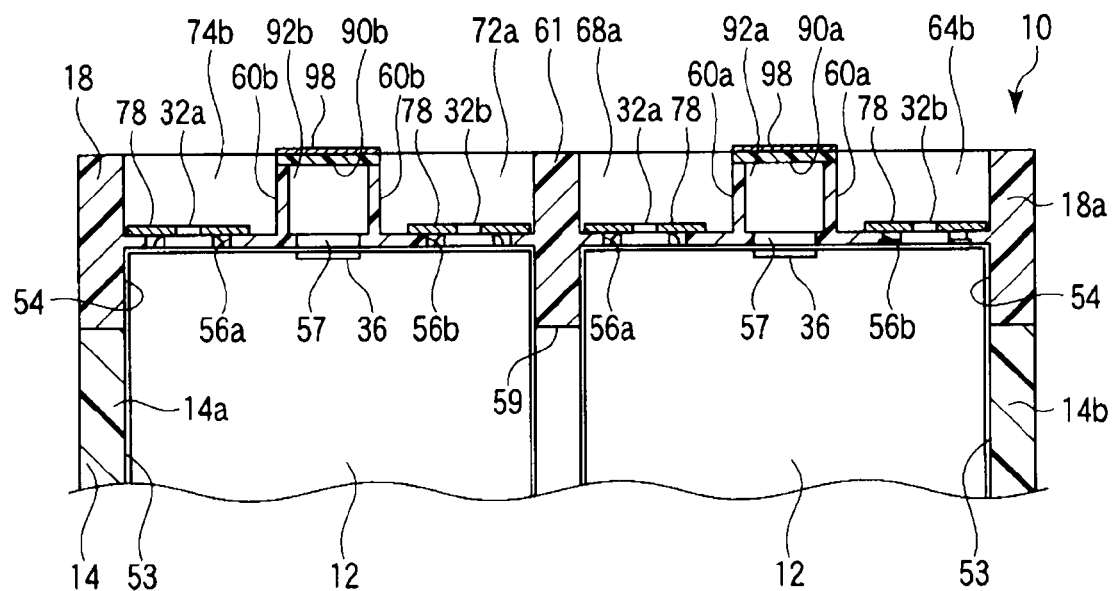
FIG. 11 is a cross-sectional view showing the secondary battery assembly taken along line B-B shown in FIG. 3.

As shown in FIGS. 4, 9, and 11, the cells 12 are accommodated by every cell units C in the accommodation rooms 53 of the case 10. The lower end portion of each cell 12 is fitted and fixed in the engaging slot 38 of the lower case 16 by adhesives. The upper end of each cell 12, i.e., the end in which the electrode terminals are arranged, is fitted and fixed in the engaging slot 54 of the upper case 18 by adhesives. In the row direction, the partition wall 50 of the center case 16 is interposed between the adjacent cell units C, thereby the short circuit between the cell units C is prevented. Moreover, the center rib 39 of the lower case 14, the center rib 59 of the upper case 18, and the support post 52 of the center case 14 are interposed between the adjacent cell units C arranged in a column direction. Accordingly, the short circuit between the cell units C is prevented.

Thus, if each cell is fitted into the engaging slots 38 and 54, and the position between the cells is decided, the adjacent cells are arranged in parallel. That is, the respective principal surfaces of the exterior container 30, i.e., the wide surfaces of the exterior container 30, are arranged so as to face in parallel with a predetermined clearance. The adjacent cell units C are also arranged so as to face in parallel having a predetermined clearance and two or more cell units C arranged in parallel having such a clearance are located in two row lines in parallel.

In the cells arranged in the row direction, the clearance between the adjacent cells 12 opposes to the vent 51 formed in the side walls 14a and 14b of the center case 14, respectively. Thereby, the vent 51 formed in the side wall 14a, the clearance between the adjacent cells and the vent 51 formed in the side wall 14b are located in a line. Open air or cooling air flows in the center case 14 from one vent 51 passing along the clearance between the adjacent cells. After the air cools the cells, the air is exhausted from the vent 51 of the other side.

Figure 12:
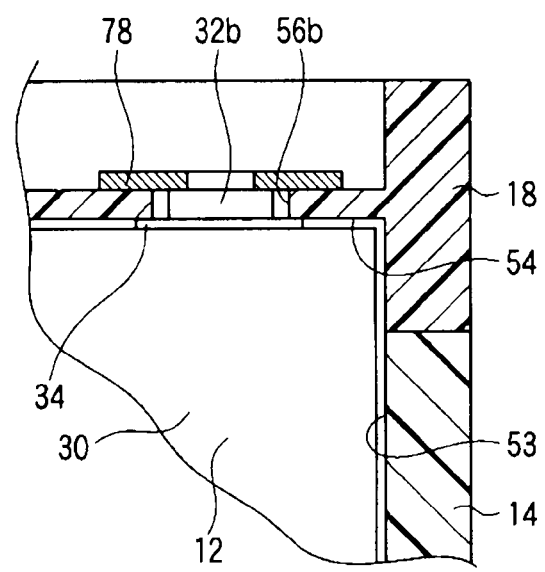
FIG. 12 is a cross-sectional view showing the secondary battery assembly in which a cathode terminal portion of the battery cell is expanded.

The anode terminal 32a and the cathode terminal 32b of the cell 12 are penetrated in the apertures 56a and 56b, respectively, and projected to the upper surface side of the upper case 18. The safety valve 36 of the cell 12 counters the exhaust aperture 57 of the upper case 18. As shown in FIG. 12, the gasket 34 exposed to the entire circumference of the cathode terminal 32b of each cell 12 is forced in the inside surface of the upper case so as to stick, and inserted so that the gasket 34 is compressed between the inside surface of the upper case 18 and the lid 30b of the cell 12. Water droplet and garbage can be prevented from invading in the case 10 through the aperture 56b by means of the gasket 34, and the short circuit between the cathode terminal 32b and the exterior container 30 by the water droplet or the garbage can be prevented certainly and simultaneously.

As shown in FIGS. 4, 9, 10, and 13, in one cell unit C, the three cells 12 are arranged so that the respective main surfaces oppose each other with a predetermined clearance, and the electrode terminals are arranged in the same direction each other. Moreover, in one cell unit C, the three cells 12 are arranged so that the respective anode terminals 32a may be located in one row line and the respective cathode terminals 32b may be located in another row line. Ten cell units C are arranged by five cell units C every two row lines.

In each row line, the terminals are arranged so that the respective anode terminals 32a and the respective cathode terminals 32b of the adjacent cell units C may be located in a line by turns. The cell units C of each line are connected by bus bars to be mentioned later, and consequently, constitute a battery unit.

A plurality of bus bars are arranged on the upper surface side of the upper case 18, and the cells 12 in each cell unit C are connected in parallel by the bus bars. Furthermore, a plurality of cell units C are connected in series. In detail, as shown in FIGS. 3, 9, 10, 11, 13, and 14, the upper surface of the upper case 18 is formed low by one step, and the peripheral wall 8a is built along with periphery on the top surface. In the upper surface of the upper case 18, a center rib 61 is formed in the center of the width direction of the upper case 18, and extends from one end to near the other end along the longitudinal direction. On the upper surface of the upper case 18, a pair of partition walls 60a and 60b are built in both sides of the center rib 61, respectively. The pair of partition walls 60a are located in the both sides of each exhaust aperture 57 formed in the upper case 18, and extends in parallel each other along the longitudinal direction from one end to the other end of the upper case 18. Similarly, the pair of partition walls 60b are located in both sides of each exhaust aperture 57 formed in the upper case 18, and extends in parallel each other along the longitudinal direction from one end to the other end of the upper case 18. The center rib 59, the partition walls 60a and 60b, and the peripheral wall 18a are formed in the almost same height.

Two partition walls 62 are built extending between the peripheral wall 18a and the walls 60a on the upper surface of the upper case 18. The partition wall 62 is formed in the almost same height as the peripheral wall 18a and the partition wall 60a. Three bus bar equipment rooms 64a, 64b, and 64c are formed in a line in the longitudinal direction of the upper case surrounded by the peripheral wall 18a, the partition wall 60a, and the partition wall 62. In the case 10, output terminals 24 and 26 are formed in a front end wall 10a. The bus bar equipment rooms 64a, 64b, and 64c are located in a line from the front end wall 10a side to a back end wall 10b side opposed to the front end wall 10a side in this order.

The bus bar equipment room 64a located in the front end wall 10a side includes three apertures 56a for the anode terminals 32a, which are arranged so as to keep a fixed interval along the longitudinal direction of the upper case 18. In the bus bar equipment room 64a, two support ribs 66 are projected from the upper surface of the upper case 18. Each support rib 66 is formed between the adjacent apertures 56a, and extends in the width direction of the upper case 18. Each support rib 66 is formed in height lower than the partition wall 62.

In each of the bus bar equipment room 64b located in the middle and the bus bar equipment room 64c by the side of the back end wall 10b, three apertures 56b for the cathode terminals 32b and three apertures 56a for the anode terminal 32a are formed from the front end wall 10a side along the longitudinal direction of the upper case 18 with a predetermined interval. In each of the bus bar equipment rooms 64b and 64c, a plurality of support ribs 66 are projected from the upper surface of the upper case 18. The support rib 66 is formed between the adjoining apertures 56a and 56b, respectively, and extends in the width direction of the upper case 18. Each support rib 66 is formed in a height lower than the partition wall 62.

Two partition walls 62 are built extending between the partition wall 60a and the center rib 61 on the upper surface of the upper case 18. The partition wall 62 is formed in the almost same height as the center rib 61 and the partition wall 60a. Two bus bar equipment rooms 68a and 68b are formed in a line in the longitudinal direction of the upper case surrounded by the partition wall 60a, the center rib 61 and the partition wall 62. Furthermore, a bus bar equipment room 70 which extends in the width direction of the upper case 18 is formed by the partition walls 60a and 60b, the peripheral wall 18a, and the partition wall 62. The bus bar equipment rooms 68a, 68b, and 70 are located in a line in this order from the front end wall 10a side.

In each of the bus bar equipment room 68a located in the front end wall 10a side and the bus bar equipment room 68b in the middle, three apertures 56b for the cathode terminal 32b, three apertures 56a for the anode terminal 32a from the front end wall 10a side, are arranged along the longitudinal direction of the upper case 18 with a predetermined interval. At each of the bus bar equipment rooms 68a and 68b, five support ribs 66 are projected from the upper surface of the upper case 18. The support ribs 66 are formed between the adjacent apertures 56a and 56b, respectively, and extend in the width direction of the upper case 18. Each support rib 66 is formed in a lower height than the partition wall 62.

Two partition walls 62 are built extending between the partition wall 60b and the center rib 61 on the upper surface of the upper case 18. The partition wall 62 is formed in the almost same height as the peripheral wall 18a and the partition wall 60b. Two bus bar equipment rooms 72a and 72b are formed in a line in the longitudinal direction of the upper case surrounded by the partition wall 60b, the center rib 61 and the partition wall 62. Furthermore, a bus bar equipment room 70 which extends in the width direction of the upper case 18 is formed by the partition walls 60a and 60b, the peripheral wall 18a, and the partition wall 62. The bus bar equipment rooms 72a, 72b, and 70 are located in a line in this order from the front end wall 10a side as mentioned above.

In each of the bus bar equipment room 72a located in the front end wall 10a side and the bus bar equipment room 72b in the middle, three apertures 56a for the anode terminal 32a, three apertures 56b for the cathode terminal 32b from the front end wall 10a side, are arranged along the longitudinal direction of the upper case 18 with a predetermined interval. In each of the bus bar equipment rooms 72a and 72b, five support ribs 66 are projected from the upper surface of the upper case 18. The support ribs 66 are formed between the adjacent apertures 56a and 56b, respectively, and extend in the width direction of the upper case 18. Each support rib 66 is formed in a height lower than the partition wall 62.

Figure 15:
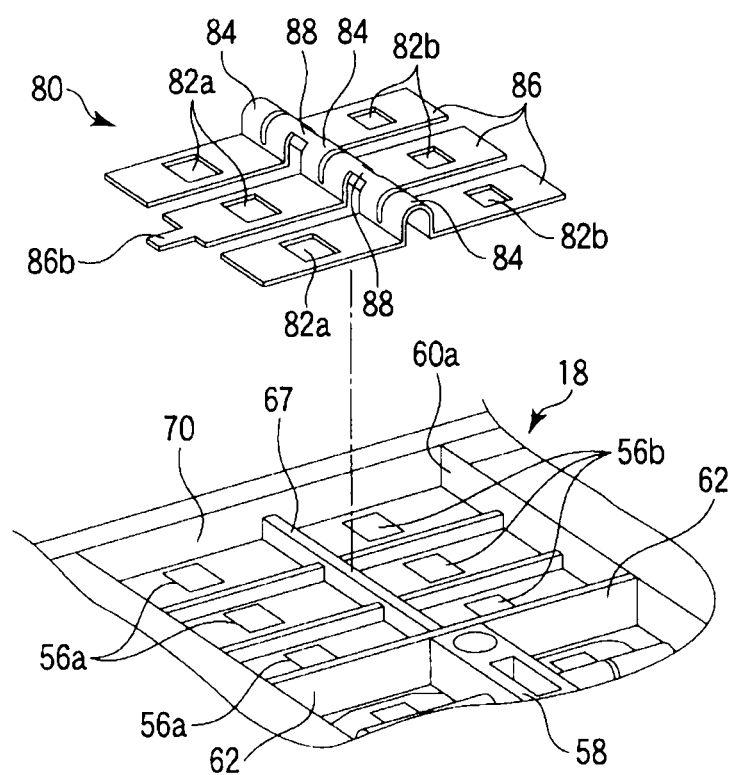
FIG. 15 is an exploded perspective view showing the bus bar unit and bus bar equipment rooms in the upper case.

As shown in FIG. 3 and FIG. 15, three apertures 56a for the anode terminals 32a, and three apertures 56b for the cathode terminals 32b are formed in the bus bar equipment room 70. Three apertures 56a for the anode terminals 32a are arranged with a predetermined interval along the longitudinal direction of the upper case 18 in a line, and also arranged in a line with the apertures 56b of the bus bar equipment room 72b. Three apertures 56b for the cathode terminals 32b are located in a line with a predetermined interval along the longitudinal direction of the upper case 18, and also arranged in a line with the apertures 56a of the bus bar equipment room 68b.

The support rib 67 is projected from the upper surface of the upper case 18 in the bus bar equipment room 70. The support rib 67 is formed between the adjoining apertures 56a and 56b, and extends in the longitudinal direction of the upper case 18. The support rib 67 is formed in a height lower than the peripheral wall 18a and the partition wall 62.

As shown in FIGS. 3, 9, 10, 11, and 13, two partition walls 62 which extend between the peripheral wall 18a and the partition walls 60b, respectively are built on the upper surface of the upper case 18. The partition wall 62 is formed in the almost same height as the peripheral wall 18a and the partition wall 60b. Three bus bar equipment rooms 74a, 74b, and 74c are formed in a line in the longitudinal direction of the upper case 18 surrounded by the peripheral walls 18a, the partition wall 60b, and the partition wall 62. The bus bar equipment rooms 74a, 74b, and 74c are located in a line in this order from the front end wall 10a side In the bus bar equipment room 74a located in the front end wall 10a side, three apertures 56b for the cathode terminals 32b are arranged with a predetermined interval along the longitudinal direction of the upper case 18. In the bus bar equipment room 74a, two support ribs 66 are projected from the upper surface of the upper case 18. Each support rib 66 is formed between the adjoining apertures 56b, and extends in the width direction of the upper case 18. Each support rib 66 is also formed in a height lower than the partition wall 62.

In each of a bus bar equipment room 74b in the middle, and a bus bar equipment room 74c by the side of the back end wall 10b, three apertures 56a for the anode terminals 32a and three apertures 56b for the cathode terminals 32b are arranged along the longitudinal direction of the upper case 18 with a predetermined interval from the front end wall 10a in a line. In each of the bus bar equipment rooms 74b and 74c, five support ribs 66 are projected from the upper surface of the upper case 18. The support ribs 66 are formed between the adjoining apertures 56a and 56b, respectively, and extend in the width direction of the upper case 18. Each support rib 66 is formed in a height lower than the partition wall 62.

Figure 13:
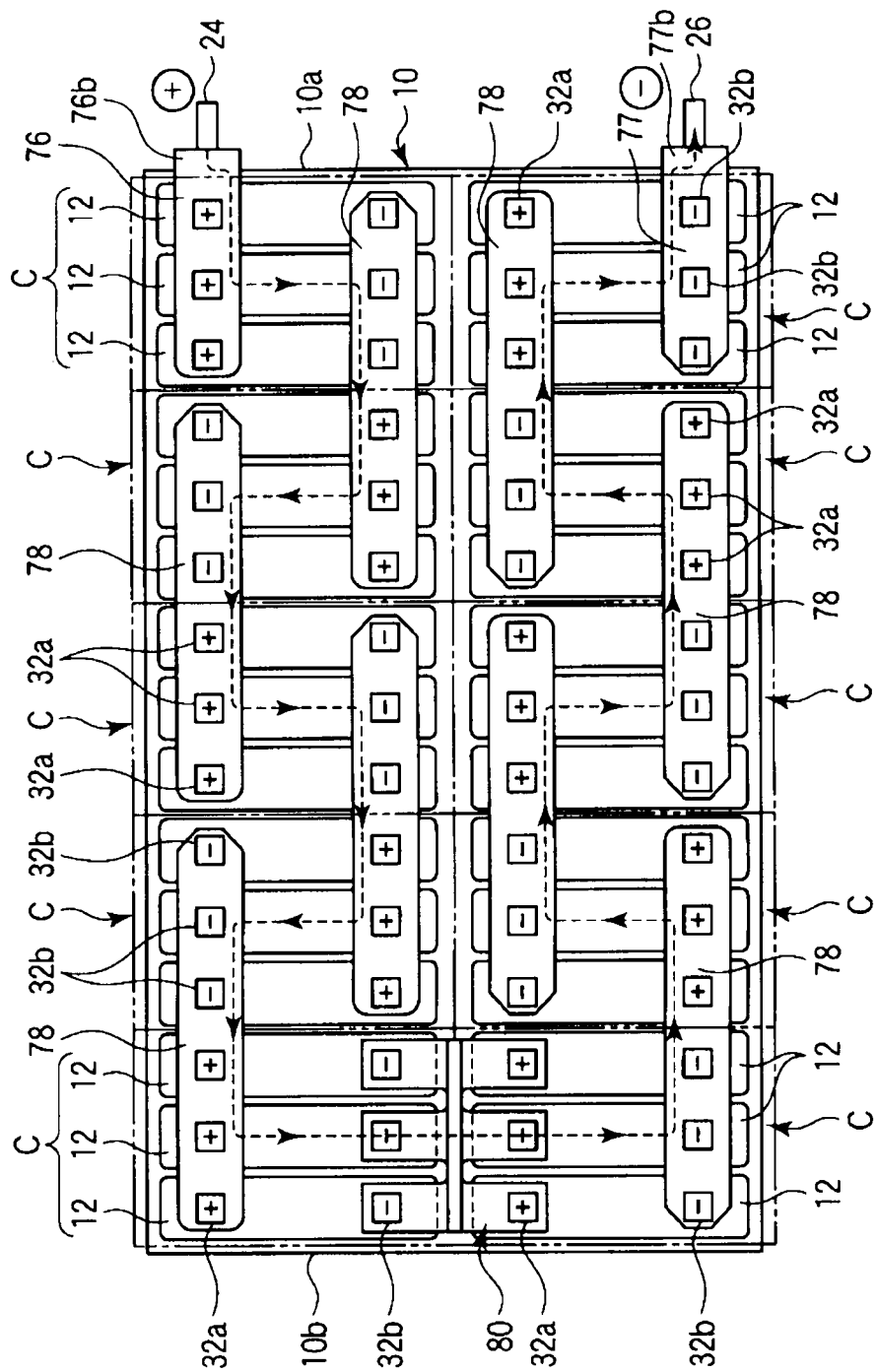
FIG. 13 is a schematic plan view showing arrangements of the cell units and bus bars, and a connection state by the bus bars in the secondary battery assembly.
Figure 14:
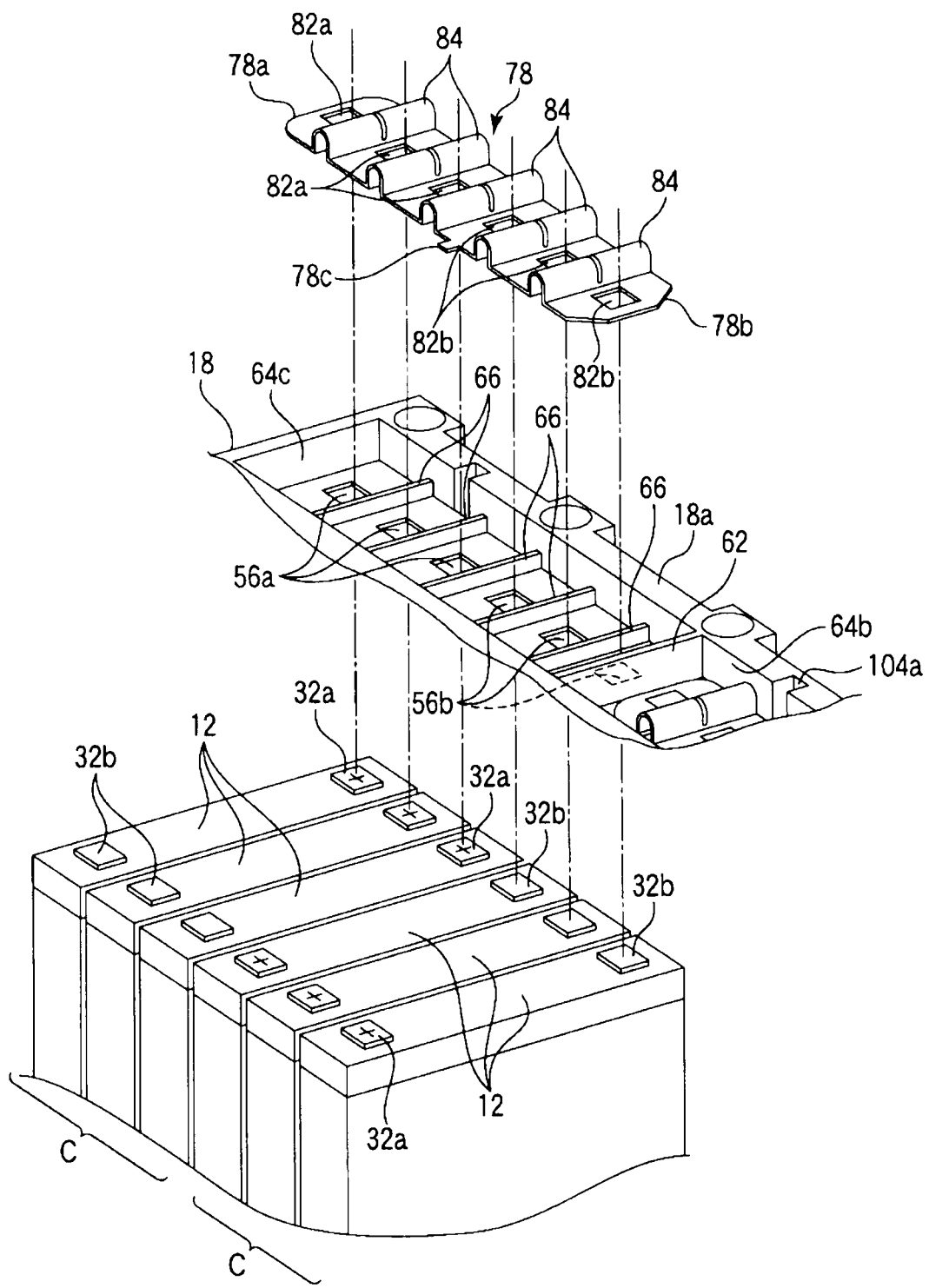
FIG. 14 is an exploded perspective view showing the cell unit, the upper case, and a common bus bar.

As shown in FIGS. 2, 3, and 13, the bus bars are equipped in the respective buss bar equipment rooms formed in the upper case 18 as mentioned above, and connected to the electrode terminals of the cells 12. In the embodiment, four kinds of bus bars are used as connection metal elements. Namely, as shown in FIGS. 2, 3, 13, 14, and 16, the first is an anode buss bar 76, which has an anode side output terminal 76b at the end while connecting the three anode terminals 32a of the three cells 12. The second is the cathode bus bar 77 which has a cathode side output terminal 77b, while connecting the three cathode terminals 32b of the cells 12. The third is eight common bus bars 78 to connect the electrode terminals of the six cells 12, respectively. The fourth is the bus bar unit 80 which connects three bus bars. The bus bars 76, 77, and 78 and the bus bar unit 80 are formed by bending metal plates which are made from electric conductive material, for example, aluminum.

The anode bus bar 76 in a long and slender rectangular shape has three anode openings 82a in which the respective anode terminals 32a of the cells 12 fit to the respective anode openings 82a. The three anode openings 82a are arranged with a predetermined interval along with the longitudinal direction of the anode bus bar 76. In the anode bus bar 76, the portion located between the adjacent anode openings 82a is bent in a shape of about U character, respectively, and forms a bending portion 84 by which elastic deformation is possible in the longitudinal direction of the anode bus bar. A slit extending in the longitudinal direction of the anode bus bar 76 is formed in each bending portion 84. By the elastic deformation of the bending portions 84, the anode bus bar 76 can be displaced along the longitudinal direction. Therefore, the anode bus bar 76 can absorb a manufacturing error in this direction and a combination error, etc. to some extent.

Figure 16A:
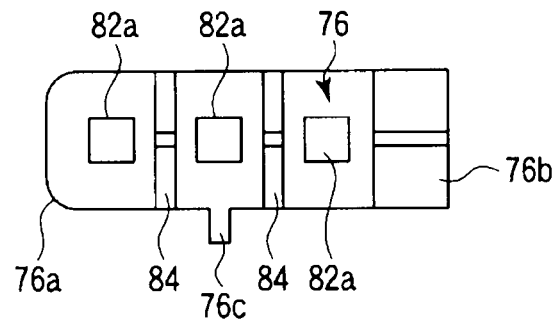
FIG. 16 is a plan view showing an anode bus bar, a cathode bus bar, and the common bus bar.

As shown in FIG. 16A, one end edge 76a of the anode bus bar 76 in the longitudinal direction is formed in a shape of, for example, a circle to show that the end is an anode terminal side. The other end edge of the longitudinal direction is bent in a shape of a crank, and forms the anode side output end terminal 76b. The anode bus bar 76 has a connection piece 76c projected from one side edge.

Figure 16B:
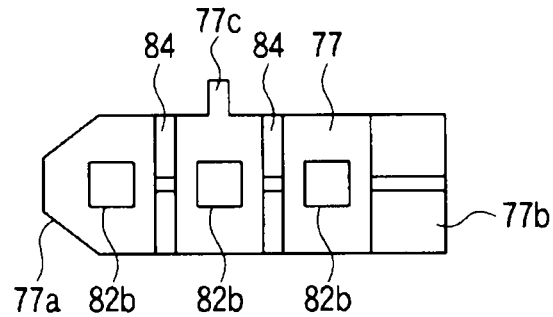

As shown in FIG. 16B, the cathode bus bar 77 is formed in a long and slender rectangular shape having three cathode openings 82b, in which the respective cathode terminals 32b of the cells 12 fit to the respective cathode openings 82b. The three cathode openings 82b are arranged with a predetermined interval along with the longitudinal direction of the cathode bus bar 77. In the cathode bus bar 77, the portion located between the adjacent cathode openings 82b is bent in the shape of about U character respectively, and forms a bending portion 84 by which elastic deformation is possible in the longitudinal direction of the cathode bus bar. A slit extending in the longitudinal direction of the cathode bus bar 77 is formed in each bending portion 84. By the elastic deformation of the bending portions 84, the cathode bus bar 77 can be displaced along the longitudinal direction. Therefore, the cathode bus bar 77 can absorb a manufacturing error in this direction and a combination error, etc. to some extent.

One end edge 77a of the cathode bus bar 77 in the longitudinal direction is formed in a shape of, for example, a trapezoid to show that the end is a cathode terminal side. The other end edge of the longitudinal direction is bent in a shape of a crank, and forms the cathode side output end terminal 77b. The cathode bus bar 77 has a connection piece 77c projected from one side edge.

Figure 16C:
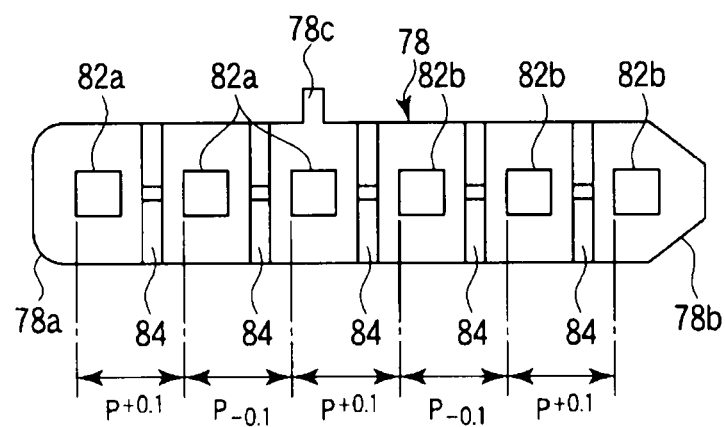

As shown in FIG. 16C, each common bus bar 78 is formed in a long and slender rectangular flat shape and includes three anode openings 82a of the rectangular shape in which the anode terminals 32a of the cells 12 are fitted to the anode openings 82a respectively, and three cathode openings 82b of the rectangular shape in which the cathode terminals 32b of the cells 12 are fitted to the cathode openings 82b respectively. In addition, corresponding to the anode terminal 32a and the cathode terminal 32b, the anode openings 82a are formed in the rectangular shape which is slightly larger than the cathode openings 82b. The three anode openings 82a and the three cathode openings 82b are arranged with a predetermined interval in a line along the longitudinal direction of the common bus bar 78. The three anode openings 82a are contiguously located in a line, and similarly, the three cathode openings 82b are also arranged contiguously.

As shown in FIG. 16C, when forming a plurality of anode openings 82a and cathode openings 82b in a predetermined pitch P, the case where the pitch shifts by common difference (for example, ±0.1 mm) is considered. In this embodiment, when forming the anode openings 82a and the cathode opening 82b, the openings are shifted and formed in a counter direction by turns by the common difference along the longitudinal direction of the common bus bar 78. That is, six anode and cathode openings 82a and 82b are formed in an irregular pitch. For example, from one edge 78a, the pitch between the openings 82a is set to P+0.1, and the following pitch is set to P−0.1, then P+0.1. That is, the openings are formed so that the pitch between adjacent openings reversely shifts in turns by the common difference.

In addition, in the anode bus bar 76 and the cathode bus bar 77, the arrangement pitch of the anode opening and the cathode opening is shifted and formed in the counter direction in turns by the common difference like the above case. By forming the anode opening 82*a* and the cathode opening 82*b* in this way, the common difference does not incline toward one way, and it becomes possible to prevent a large position gap between the adjacent anode openings and the adjacent cathode openings.

As shown in FIGS. 2, 3, 13, 14, and 16, in the common bus bar 78, a portion located between the adjacent openings is bent in a shape of about U character, and forms a bending portion 84 by which elastic deformation is possible in the longitudinal direction of the common bus bar. A slit extending in the longitudinal direction of the common bus bar 78 is formed in each bending portion 84. By the elastic deformation of the bending portions 84, the common bus bar 78 can be displaced along the longitudinal direction. Therefore, the common bus bar 78 can absorb a manufacturing error in this direction and a combination error, etc. to some extent.

In the common bus bar 78, one end edge 78*a* side in which the anode opening 82*a* is formed is shaped differently from that of the other end edge 78*b* side in which the cathode opening 82*b* is formed. For example, one end edge 78*a* by the side of the anode opening 82*a* is formed circularly to show that the edge is the anode side, and the other end edge 78*b* by the side of the cathode opening 82*b* is formed in the shape of a trapezoid to show that the edge is the cathode side. Thus, the anode side can be distinguished easily from the cathode side of the common bus bar 78. Accordingly, when the upper case 18 is equipped with the common bus bar 78 by making the form of the both-end edges different, it becomes possible to equip with the common bus bar in a right direction easily. The common bus bar 78 has a connection piece 78*c* formed integrally so as to project from one side edge.

The anode bus bar 76, the cathode bus bar 77, and the common bus bar 78 which are constituted as mentioned above are equipped in the corresponding bus bar equipment rooms, and the bus bars connects between the electrode terminals of the cells 12. As shown in FIG. 2, 9, and. 13, the anode bus bar 76 is equipped in the bus bar equipment room 64*a* contiguous to the anode output terminal 24. The anode bus bar 76 is held so that the bus bar 76 is positioned in the bus bar equipment room 64*a* in a predetermined position, by fitting the opening side of each bending portion 84 to the support rib 66 projected from the bus bar equipment room 64*a*. Thereby, the anode opening 82*a* of the anode bus bar 76 aligns with the corresponding apertures 56*a*, respectively formed on the upper case 18.

The respective anode terminals 32*a* of the cells 12 are fitted to the three anode openings 82*a* of the anode bus bar 76, and welded to the anode bus bar 76 by laser welding. The laser welding may be replaced with an electron beam welding or a resistance welding. Thereby, the anode terminals 32*a* of the three cells 12 in one cell unit C are electrically connected by the anode bus bar 76. The output end 76*b* of the anode bus bar 76 is exposed to the front end wall 10*a* side of the case 10 while fitting to the upper portion of the peripheral wall 18*a* of the upper case 18.

The cathode bus bar 77 is fitted in the bus bar equipment room 74*a* contiguous to the cathode output terminal 26. The cathode bus bar 77 is held so that the cathode bus bar 77 is positioned in the bus bar equipment room 74*a* in the predetermined position, by fitting the opening side of each bending portion 84 to the support rib 66 projected from the bus bar equipment room 74*a*. Thereby, the cathode opening 82*b* of the cathode bus bar 77 aligns with the corresponding apertures 56*b*, respectively on the upper case 18. The cathode terminals 32*b* of the cells 12 are fitted to the three cathode openings 82*b* of the cathode bus bar 77, respectively, and welded to the cathode bus bar 77 by laser welding etc. Thereby, the cathode terminals 32*b* of the three cells 12 in one cell unit C are electrically connected by the cathode bus bar 77. The cathode side output end 77*b* of the cathode bus bar 77 is exposed to the front end wall 10*a* side of the case 10 while fitting on the upper portion of the peripheral wall 18*a* of the upper case 18.

As shown in FIGS. 2, 3, 9, 10, 13, and 14, the eight common bus bars 78 are respectively equipped in the bus bar equipment rooms 64*b* and 64*c* located in a line with the anode bus bar 76, in the bus bar equipment rooms 68*a* and 68*b* of the next line, in the bus bar equipment rooms 72*a* and 72*b* of the further next line, and in the bus bar equipment rooms 74*b* and 74*c* located in a line with the cathode bus bar 77.

The common bus bars 78 equipped in the bus bar equipment rooms 64*b* and 64*c* and the bus bar equipment rooms 68*a* and 68*b* of the next line are arranged so that the respective cathode edge sides 78*b* face to the front end wall 10*a* side of the case 10. The common bus bars 78 are held in the state where the common bus bars 78 are positioned in each bus bar equipment room in a predetermined position, by fitting the opening side of each bending portion 84 to the support rib 66 projected from the bus bar equipment room. Thereby, the cathode opening 82*b* and the anode opening 82*a* of the common bus bar 78 align with the corresponding apertures 56*b* and 56*a* in the upper case 18, respectively.

The cathode terminals 32*b* are welded to the common bus bar 78 while the cathode terminals 32*b* of the cells 12 are fitted to three cathode openings 82*b* of the common bus bar 78, respectively. Thereby, the cathode terminals 32*b* of the three cells 12 in one cell unit C are electrically connected by the common bus bar 78. Moreover, the anode terminals 82*a* are welded to the common bus bar 78 while the anode terminals 32*a* of the cells 12 are fitted to the three anode openings 82*a* of the common bus bar 78, respectively. Thereby, the anode terminals 32*a* of the three cells 12 in one cell unit C are electrically connected by the common bus bar 78, further connected with the cathode terminal 32*b* of the cell 12 of the next cell unit C.

The common bus bars 78 equipped in the bus bar equipment rooms 72*a* and 72*b* and the bus bar equipment rooms 74*b* and 74*c* of the next line are arranged so that the respective anode edge sides 78*a* face to the front end wall 10*a* side of the case 10. The common bus bars 78 are held in the state where the respective bus bars are positioned at each bus bar equipment room in a predetermined position, by fitting the opening side of each bending portion 84 to the support rib 66 projected from the bus bar equipment room. Thereby, the cathode opening 82*b* and the anode opening 82*a* of the common bus bar 78 align with the corresponding apertures 56*b* and 56*a* in the upper case 18 respectively.

The anode terminals 32*a* of the cells 12 are welded to the common bus bar 78 while the anode terminals 32*a* are fitted to three anode openings 82*a* of the common bus bar 78, respectively. Thereby, the anode terminals 32*a* of the three cells 12 in one cell unit C are electrically connected by the common bus bar 78. Moreover, the cathode terminals 32*b* are welded to the common bus bar 78 while the cathode terminals 32*b* of the cells 12 are fitted to the three cathode openings 82*b* of the common bus bar 78, respectively. Thereby, the cathode terminals 32*b* of the three cells 12 in one cell unit C are electrically connected by the common bus bar 78, further connected with the anode terminal 32*a* of the cell 12 of the next cell unit C.

Accordingly, two battery units are constructed in which respective battery units are formed by arranging a plurality of cell units closely in a line and connecting the cell units by the buss bars. The battery units are arranged in parallel, and electrically connected by the bus bar unit 80 which functions as a coupling bus bar.

As shown in FIGS. 2, 3, 13, and 15, the bus bar unit 80 are constructed by connecting three rectangular board-like bus bars 86 each other. Each bus bar 86 includes an anode opening 82a formed in one end portion and a cathode opening 82b formed in the other end portion of the longitudinal direction. A portion between the anode opening 82a and the cathode opening 82b is bent in a shape of U character, and forms a bending portion 84. A slit extending in the longitudinal direction of the bus bar 86 is formed in the bending portion 84. By the elastic deformation of the bending portion 84, the bus bar 86 can be displaced along the longitudinal direction, consequently, which results in an absorption of a manufacturing error and a combination error, etc. in the direction to some extent.

The three bus bars 86 are arranged with a gap between adjoining buss bars in the width direction of the upper case 18, and the respective bending portions 84 are aligned. The anode opening 82a and the cathode opening 82b are arranged in two lines in parallel. The adjoining bending portions 84 are connected by a bridge portion 88 each other. Thereby, the three bus bars 86 are connected, and can be dealt with as one unit. Moreover, the bus bar 86 can be displaced along the width direction by the elastic deformation of each bridge portion 88, and can absorb the manufacturing error and a combination error, etc. in the direction. One bus bar 86, for example, the bus bar in the middle, has a connection piece 86b projected from an edge of the anode side.

The bus bar unit 80 is equipped in the equipment room 70 of the upper case 18. The bus bar unit 80 is held in the state where the respective bus bars 86 are arranged in predetermined positions, by fitting the opening side of each bending portion 84 to the support rib 66 projected from the bus bar equipment room 70. Thereby, the anode openings 82a and the cathode openings 82b of the respective bus bars 86 align with the corresponding apertures 56a and 56b in the upper case 18.

The three anode terminals 32a of the cells 12 are welded to the bus bars 86 while the three anode terminals 32a are fitted to the three anode openings 82a of the bus bars 86, respectively. Thereby, the anode terminals 32a of the three cells 12 in one cell unit C are electrically connected by the bus bar unit 80. Moreover, the cathode terminals 32b of the cells 12 are welded to the bus bars 86 while the cathode terminals 32b are fitted to the three cathode openings 82b of the bus bars 86, respectively. Thereby, the cathode terminals 32b of the three cells 12 in one cell unit C are electrically connected by the bus bar unit 80, further connected with the anode terminal 32a of the cell 12 of the next cell unit C.

As schematically shown in FIG. 13, the three cells 12 of each cell unit C are connected in parallel by the plurality of bus bars and the bus bar unit mentioned above, and consequently, the ten cell units C are connected in series each other. Moreover, the anode output terminal 24 and the cathode output terminal 26 are formed in the same wall surface of the case 10, i.e., a front end wall 10a side. Accordingly, the ten cell units C are connected from the anode output terminal 24 along with the shape of a U character to the cathode output terminal 26.

As shown in FIG. 3 and FIG. 11, a blocking board 90a of the shape of a long and slender rectangle is fixed on the pair of partition walls 60a built on the upper surface of the upper case 18, and extends for full length in the longitudinal direction of the upper case 18. A space between the pair of partition walls 60a is closed with the blocking board 90a. The exhaust channel 92a extends for the full length in the longitudinal direction of the upper case 18. The exhaust apertures 57 formed in the upper case 18 and arranged in a line communicates with the exhaust channel 92a. Exhaust apertures 94 which communicate with an end of the exhaust channel 92a are formed in one end, for example, the back end wall of the longitudinal direction of the upper case 18. The exhaust apertures 94 are closed by a check valve 96 equipped at the back end wall of the upper case 18.

Similarly, the blocking board 90b of a shape of long and slender rectangle is fixed on the pair of partition walls 60b built on the upper surface of the upper case 18, and extends for the full length in the longitudinal direction of the upper case 18. A space between the pair of partition walls 60b is closed with the blocking board 90b. The exhaust channel 92b extends for the full length in the longitudinal direction of the upper case 18. The exhaust apertures 57 formed in the upper case 18 and arranged in a line communicate with the exhaust channel 92b. Exhaust openings 94 which communicate with an end of the exhaust channel 92b are formed, for example, at a back end wall of the longitudinal direction of the upper case 18. The exhaust openings 94 are closed by a check valve equipped at the back end wall of the upper case 18.

When gas is emitted in the exterior container 30 by an extraordinary mode of the cell 12 and pressure rises in an exterior container beyond a predetermined value, the safety valve 36 opens, and the gas is emitted outside through the safety valve 36. In this case, the emitted gas is exhausted by either of the exhaust channel 92a or 92b corresponding to the exhaust apertures 57. If the pressure in the exhaust channel 92a and 92b rises by the exhausted gas, the check valve 96 opens and the gas in the exhaust channels 92a and 92b is exhausted outside through the exhaust openings 94.

Figure 17:
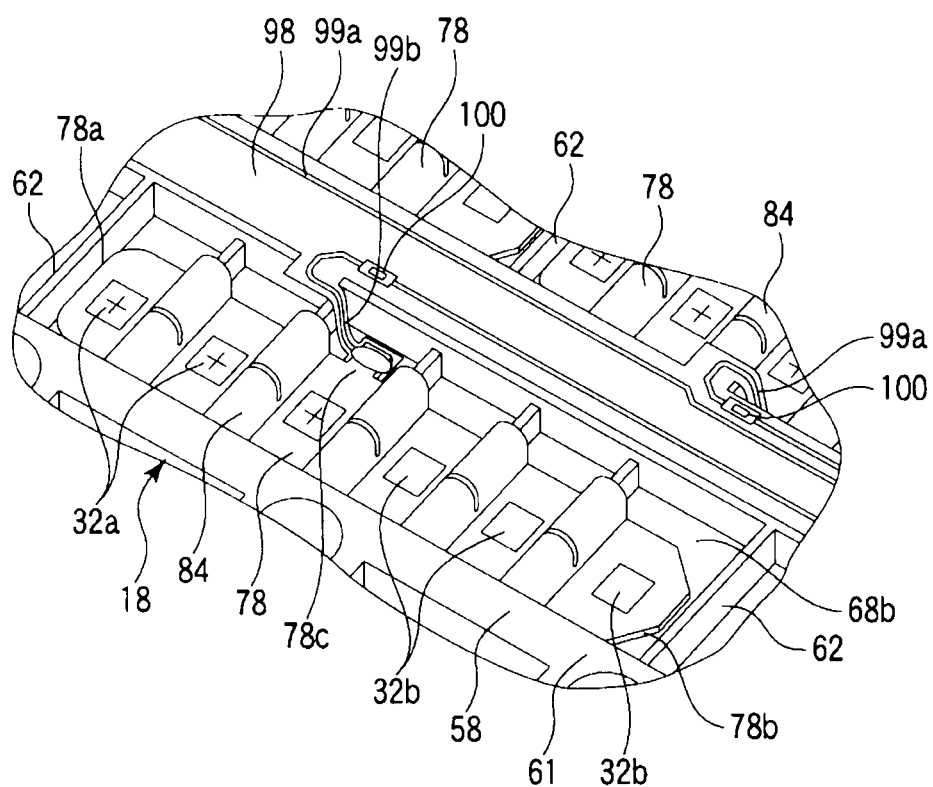
FIG. 17 is a perspective view of an upper portion of the upper case showing a connection state of the bus bars with an FPC.

As shown in FIGS. 3, 11, and 17, a pair of flexible printed circuits (FPC) 98 for measuring a voltage of the cell 12 is stuck on the upper surface of the blocking boards 90a and 90b, respectively. The respective FPCs 98 are formed in a belt-like shape having a width almost equal to the blocking boards 90a and 90b and extend for full length in the longitudinal direction of the upper case 18. An end portion 98a is projected from the front end of the case 10 to the front side. Each FPC 98 has a plurality of wirings extending in the longitudinal direction from one end portion 98a. The other end portion of the wiring extends outside from the side edge of the FPC 98, respectively. For example, in one FPC 98, three wirings 99a are pulled out outside from one side edge of one FPC 98, respectively, and two wirings 99b are pulled out outside from the other side edge of the FPC 98. In the other FPC 98, three wirings 99a are pulled out outside from one side edge, respectively, and three wirings 99b are also pulled out outside from the other side edge.

Extending out ends of the wirings 99a and 99b pulled out from the FPC 98 are connected to corresponding bus bars, electrically and mechanically. As shown in FIG. 17, the extending out ends of the respective wirings 99a and 99b, for example, the extending out end of the wiring 99b, is soldered in the state where the extending out end is inserted between the connection piece 78c of the common bus bar 78 and the upper surface of the upper case 18. With respect to other bus bars and bus bar units 80, the extending out ends of the wirings 99a and 99b are soldered to the connection pieces 76c, 77c, and 78c in the state where the extending out ends are inserted between the connection pieces and the upper surface of the upper case 18, respectively. The extending out portions of the respective wirings 99a and 99b are formed so that the wirings may extend in a slack state slightly between the connection end connected to the connection pieces and the side edge of the FPC 98. Thereby, disconnection of wirings can be prevented even when tension load acts on the extending out ends of the wirings 99a and 99b.

As shown in FIG. 3, connection terminals connected to the wirings 99a and 99b are formed at the end portion 98a of each FPC 98. The connection terminals are connected to a battery checking board 28 as explained later. The battery checking board 28 measures and checks the voltage of each cell unit C through the FPC 98. As shown in FIG. 3 and FIG. 17, resistors 100 are provided in the halfway portion of respective wirings 99a and 99b of the FPC 98. For example, each resistor 100 is formed in several ohms or hundreds of ohms so as to regulate over discharge from the cell 12, and protect the battery checking board 28.

According to the embodiments, since each bus bar is connected to the battery checking board 28 using the above FPC 98, the leading out of the wirings is easier compared with the case where two or more harnesses are used. Therefore, simplified assembly process and small space for wiring of the battery assembly can be obtained.

Figure 18:
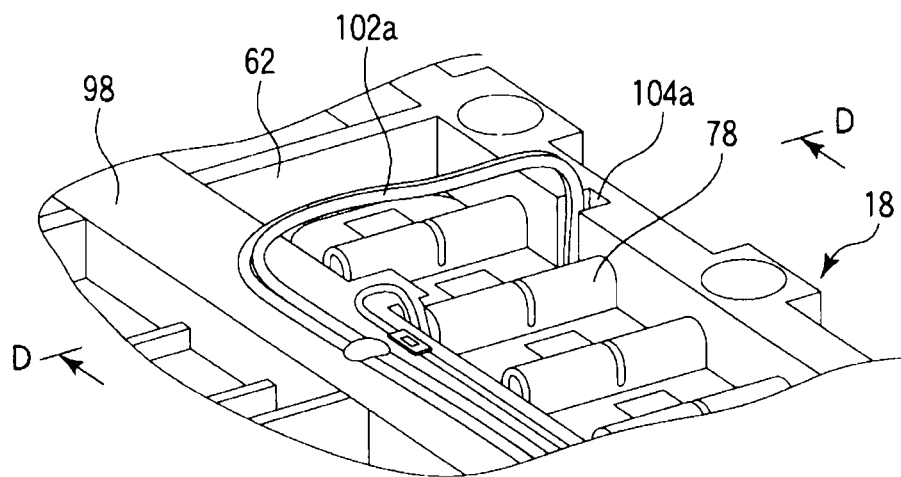
FIG. 18 is a perspective view showing the upper portion of the upper case and a thermistor arranged on the upper portion.
Figure 19:
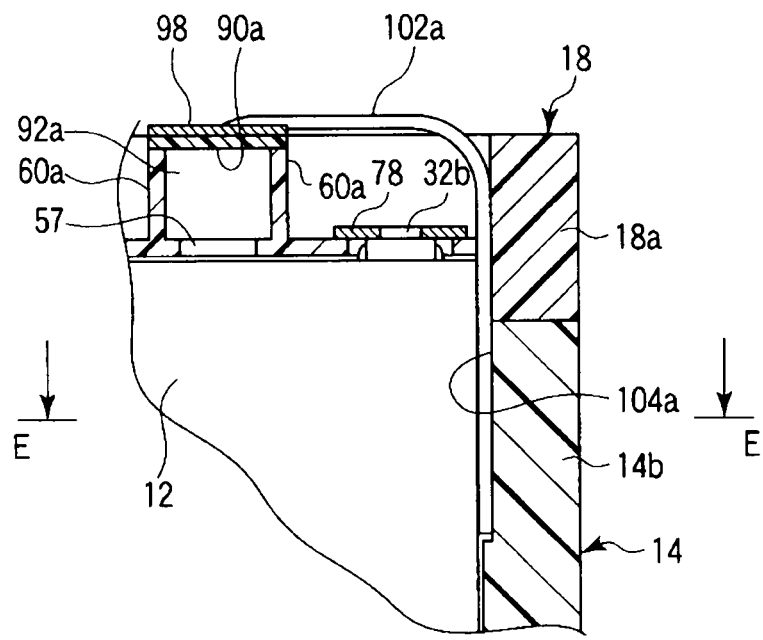
FIG. 19 is a cross-sectional view showing the secondary battery assembly taken along line D-D shown in FIG. 18.
Figure 20:
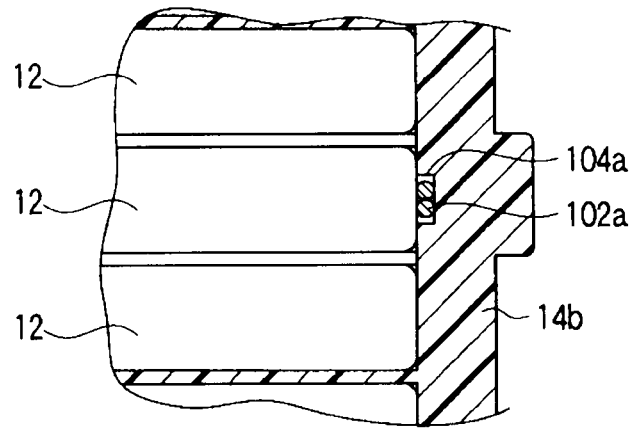
FIG. 20 is a cross-sectional view showing the secondary battery assembly taken along line E-E shown in FIG. 19.

As shown in FIG. 2 and FIG. 18, two thermistors 102a and 102b to detect temperature of the cells 12 are formed on the upper case 18. Each of the thermistors 102a and 102b is formed of two wires. As shown in FIG. 2, FIG. 8 and FIG. 18 to FIG. 20, guide slots 104a and 104b are formed in the inside of the peripheral wall 18a of the upper case 18 and the center case 14 so as to penetrate the bus bar equipment room and extend to one half of the height of the center case 14. In this embodiment, the guide slot 104a is formed in a position which penetrates the bus bar equipment room 64b in the middle of the first line of the cell units C, and the guide slot 104b is formed in a position which penetrates the bus bar equipment room 74c of the back end side of the fourth line of the cell units C in the longitudinal direction, respectively.

The detecting portion of the thermistor 102a, i.e., the tipping portion is inserted in the guide slot 104a from the upper surface side of the upper case 18, and pressed in the lower end of the guide slot 104a. Thereby, the detecting portion of the thermistor 102a is sandwiched between the side wall 14b of the center case 14 and the cell 12, and pressed to the side of the exterior container of the cell 12. The thermistor 102a is led out on the FPC 98, and connected to a connector 106 provided on an end portion of the FPC 98. The connector 106 is electrically connected to the battery checking board 28 mentioned later. Moreover, the thermistor 102a is adhered at a plurality of places on the upper case 18 and the FPC 98. The thermistor 102a detects the temperature of the cell 12 arranged in a position where temperature is comparatively high in the battery assembly, and outputs the measured temperature to the battery checking board 28.

The detecting portion of another thermistor 102b is inserted in the guide slot 104b from the upper surface side of the upper case 18, and pressed in the lower end of the guide slot 104b. Thereby, the detecting portion of the thermistor 102b is sandwiched between the side wall 14a of the center case 14 and the cell 12, and is pressed to the side of the exterior container of the cell 12. The thermistor 102b is led out on the FPC 98, and connected to a connector 106 provided on the end part of FPC 98. The connector 106 is electrically connected to the battery checking board 28 mentioned later. Moreover, the thermistor 102b is adhered at a plurality of places on the upper case 18 and the FPC 98. The thermistor 102b detects the temperature of the cell 12 arranged in a position where temperature is comparatively high in the battery assembly, and outputs the measured temperature to the battery checking board 28.

Thus, the thermistors 102a and 102b are pressed to the selected cell 12 by only inserting them into the guide slots 104a and 104b formed in the case, respectively. Accordingly, the thermistors are installed easily without using special parts for fixing. Moreover, since the thermistors 102a and 102b are arranged so that the side of the exterior container of the cell 12 contacts with the thermistors, the gap between the cells 12 can be set up more narrowly as compared with the case where the thermistor contacts with the principal surface of the exterior container of the cell 12. Thereby, the length of the battery assembly is shortened and it becomes possible to attain a miniaturization.

As shown in FIGS. 1, 2, 21, and 22, the rectangular board-like terminal base 22 is attached to the external surface side of the front end wall 10a of the case 10. The battery checking board 28 is fixed by screws on the external surface of the terminal base 22. The end portion 98a of the respective FPCs 98 and the thermistors 102a and 102b are electrically connected to the battery checking board 28 through connectors etc. which are not illustrated. The battery checking board 28 checks the cell temperature detected by the thermistors 102a and 102b while detecting and checking the voltage between the cell units C through the FPC 98. Moreover, the battery checking board 28 has a balance regulation circuit to adjust the balance of the voltage between the cells.

The anode output terminal 24 and the cathode output terminal 26 are attached to the terminal base 22. The cathode output terminal 26 is constructed by a terminal base element 26a formed of a stainless steel plate, and a tabular electric conduction terminal 26b arranged in piles with the terminal base element 26a and formed of a metal having high conductivity, such as copper.

A stud bolt 26c which functions as a connecting element is built at a central lower portion of the terminal base element 26a. For example three screw apertures are formed in the peripheral portion of the terminal base element 26a, and two screw apertures 107 are formed along an upper end of the terminal base element 26a. The electric conduction terminal 26b has an aperture 108 by which the stud bolt 26c is penetrated, an aperture 109 formed in the lower end portion, and two apertures 110 formed in the upper end portion corresponding to the apertures 107 of the terminal base element 26a, respectively.

The electric conduction terminal 26b is arranged in piles with the terminal base element 26a so that the stud bolt 26c is penetrated the aperture 108, and fixed to the terminal base element 26a by a screw penetrated in the aperture 109. The apertures 110 of the electric conduction terminal 26b align with the screw apertures 107 of the terminal base element 26a, respectively.

The terminal base element 26a where the electric conduction terminal 26b is fixed is arranged at the inside of the terminal base 22, and fixed to the terminal base 22 by two screws penetrated from the external surface side of the terminal base 22. Thereby, the electric conduction terminal 26b is sandwiched between the terminal base element 26a and the terminal base 22. The stud bolt 26c is projected to the outside through an opening 112 formed in the terminal base 22. In the electric conduction terminal 26b, the portion located in the circumference of the stud bolt 26c is exposed outside through the opening 112. The upper end of the electric conduction terminal 26b including the apertures 110 is also exposed to the outside through the opening 114 formed in the upper end portion of the terminal base 22.

The anode output terminal 24 is constituted as well as the cathode output terminal 26. That is, the anode output terminal 24 has a terminal base element 24a, an electric conduction terminal 24b fixed to the terminal base element 24a in piles, and the terminal base element 24a is fixed by screws at the inside of the terminal base 22. The stud bolt 24c, which functions as a connection portion, is projected to the outside through an opening 116 formed in the terminal base 22. In the electric conduction terminal 24b, the portion located in the circumference of the stud bolt 24c is exposed outside through the opening 116. The upper end portion of the electric conduction terminal 24b including the apertures 118 is also exposed to the outside through an opening 120 formed in the upper end portion of the terminal base 22.

The terminal base 22 to which the anode output terminal 24 and the cathode output terminal 26 are equipped is fixed at the front end wall 10a of the case 10 by screws. The anode output terminal 24 is held between the terminal base 22 and the front side of the case 10. The upper end portion of the anode output terminal 24 is inserted between the anode side output end 76b of the anode bus bar 76 and the front side of the case 10, and overlaps with the anode side output end 76b. The upper end of the anode output terminal 24 is fixed at the anode side output end 76b with a pair of screws penetrated into the terminal base element 24a through a pair of apertures formed in the anode side output end 76b of the anode bus bar 76 and the apertures 118 of the electric conduction terminal 24b. Thereby, the anode output terminal 24 is connected to the anode bus bar 76 electrically and mechanically.

The upper end portion of the cathode output terminal 26 is inserted between the cathode side output end 77b of the cathode bus bar 77 and the front side of the case 10, and overlaps with the cathode side output end 77b. The upper end of the cathode output terminal 26 is fixed at the cathode side output end 77b with a pair of screws penetrated into the terminal base element 26a through a pair of apertures formed in the cathode side output end 77b of the cathode bus bar 77 and the apertures 110 of the electric conduction terminal 26b. Thereby, the cathode output terminal 26 is connected to the cathode bus bar 77 electrically and mechanically.

According to the embodiment, since the anode output terminal 24 and the cathode output terminal 26 are fixed in the common terminal base 22, it becomes possible to raise the assembly efficiency. Moreover, each of the anode output terminal 24 and the cathode output terminal 26 interposes the terminal base elements 26a, 24a fixed to the terminal base 22 between the bus bar and the electric conduction terminal. The stud bolts 24c, 26c are provided in the terminal base elements 26a, 24a for connection. Accordingly, when equipping a harness for outputting to the stud bolts or removing the harness from the stud bolts, the load which acts on the electric conduction terminal and the bus bars can be reduced. This makes possible to prevent deformation or damage of the electric conduction terminals and the bus bars.

As shown in FIG. 1 and FIG. 2, a top cover 20 is formed in a rectangular shape having a size almost equal to the plane form of the case 10 so as to cover a plurality of bus bar equipment rooms of the upper case 18. A peripheral portion and a center portion of the top cover 20 are respectively fixed to a peripheral wall and a center rib of the upper case 18 by screws in a liquid-tight manner.

Figure 23:
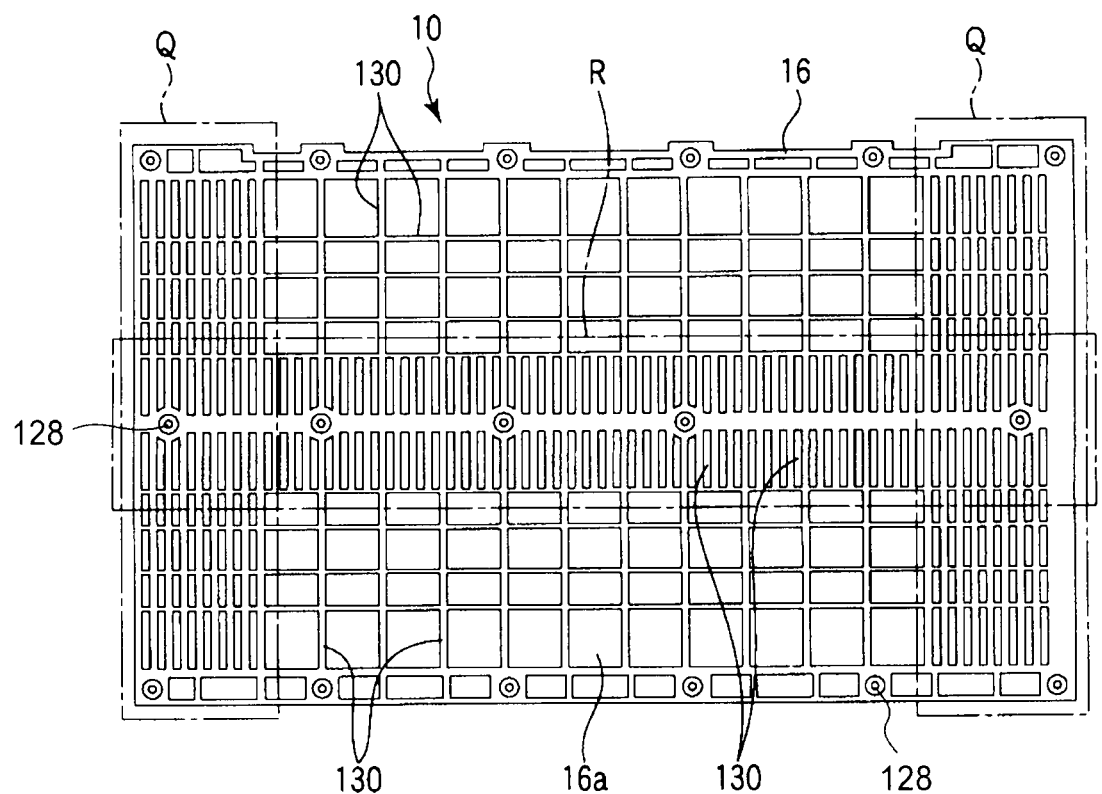
FIG. 23 is a plan view showing a bottom of the case.

FIG. 23 shows one side of the case 10, that is, a bottom face 16a of the lower case 16. A plurality of apertures 128 for inserting screws are formed in both-side edges and a central portion of the bottom 16a along with the longitudinal direction. Moreover, many ribs 130 are formed on the bottom 16a in a lattice shape. The ribs 130 are formed in the same height. The ribs 130 are formed so that weight of the lower case 16 is saved and that mechanical strength and cooling efficiency are raised.

The ribs 130 arranged in a center region R for full length along the longitudinal direction of the bottom 16a is formed in a more finely-divided state, namely at a smaller interval, as compared with the ribs 130 arranged in other regions. Moreover, in this embodiment, the ribs 130 arranged in a region Q of both narrow ends for full length of the width direction of the bottom 16a are also formed in a more finely-divided state, namely at a smaller interval, as compared with the ribs 130 arranged in other regions. Thereby, in the regions R and Q, an installation area formed of the tip side of each rib 130 can be made large. According to this structure, when sticking sheet-like cushion material on the regions R and Q of the bottom 16a, the contact surface area of the cushion material with the bottom 16a can be enlarged, and the cushion material can be certainly stuck to the ribs 130.

Figure 24:
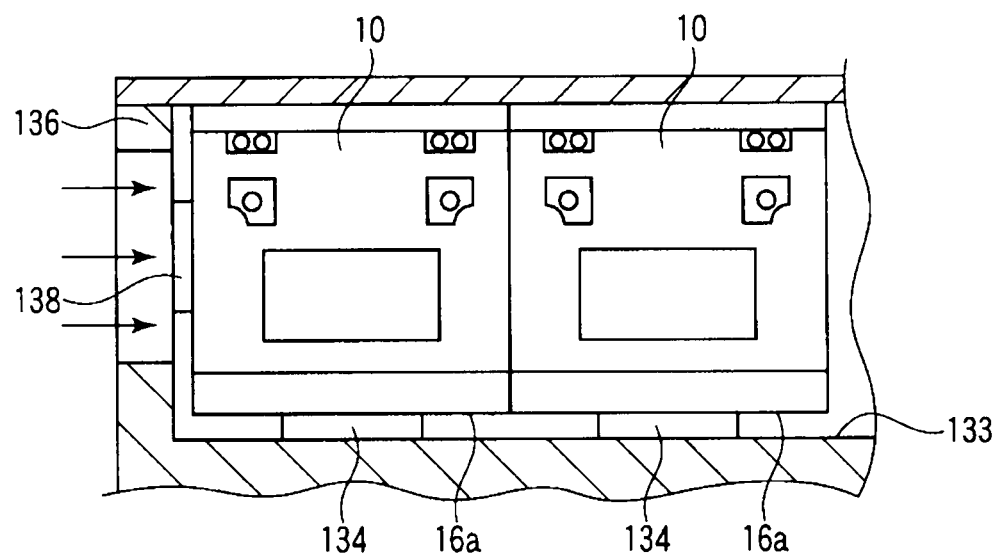
FIG. 24 is a side view showing an example in which two secondary battery assemblies are installed in a predetermined position of the case.

FIG. 24 shows an embodiment in which two secondary battery assemblies of the above-mentioned structure are installed. In the embodiment, the respective battery assemblies are arranged so that the sides of the case 10 face each other, and the bottom 16a is arranged on an installation side 133 interposing the sheet-like cushion material 134 therebetween. The cushion material 134 is stuck on the region R of the bottom 16a. The secondary battery assembly can be positioned to a setting position by fitting a convex portion 138 projected from the standing-up wall 136 to the positioning concave portion 58 (refer to FIG. 1) of the case 10. Moreover, a ventilating window is formed in the standing-up wall 136. The cooling wind supplied to the setting position through the ventilating window is supplied to the circumference of the cell 12 through the vent 51 of the case 10. Thereby, the cells 12 in the secondary battery assembly can be cooled. Moreover, the space between the bottom 16a of the case 10 and the installation side 133 is divided by the cushion material 134. Therefore, the cooling wind does not flow between the bottom 16a of the case 10 and the installation side 133, and the cooling wind is efficiently supplied in the case 10.

Figure 25:
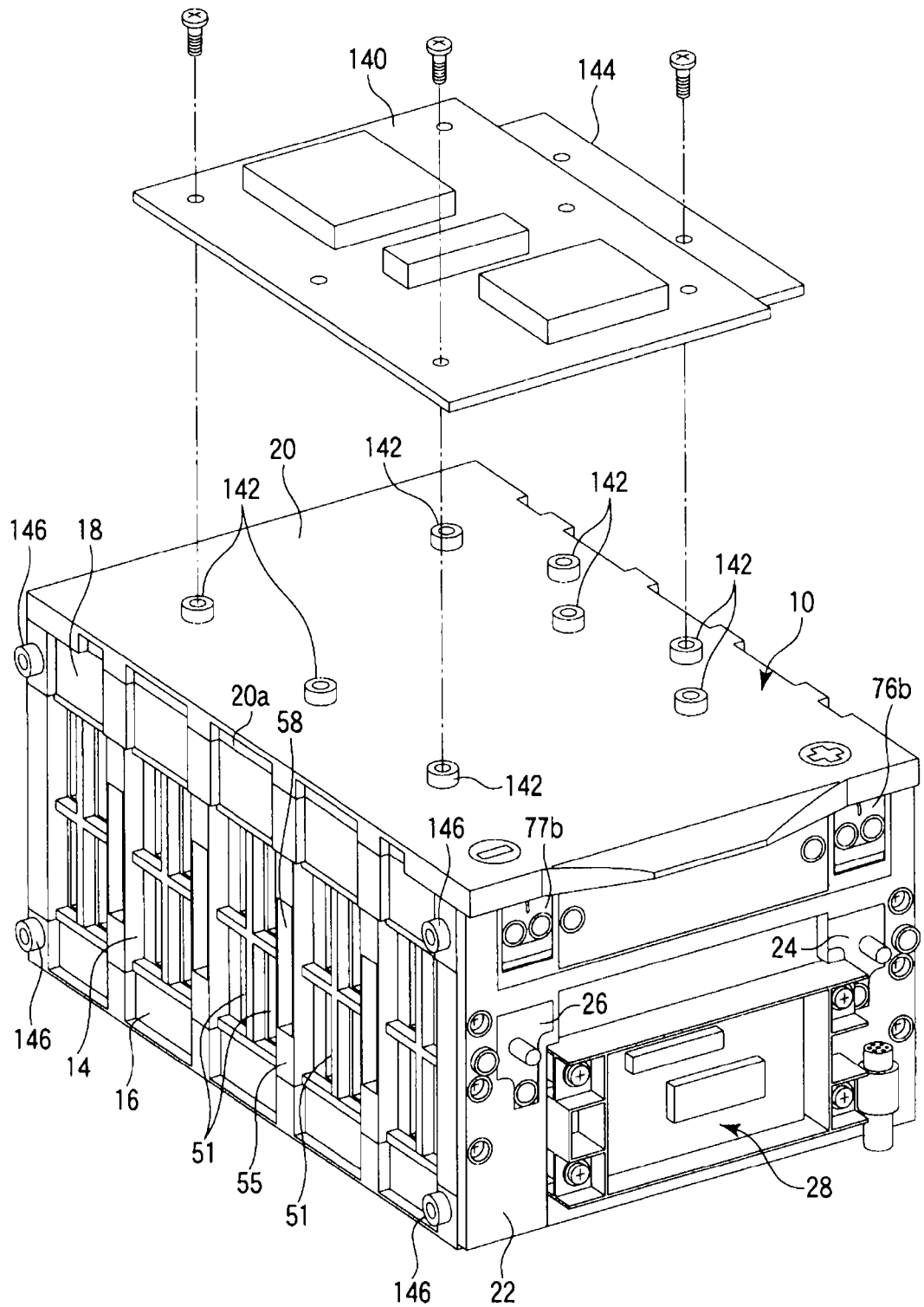
FIG. 25 is a perspective view showing a modification of the secondary battery assembly.

FIG. 25 shows a secondary battery assembly equipped with a plurality of bosses for attaching a control board 140. When installing two or more secondary battery assemblies, the control board 140 which controls the plurality of secondary battery assemblies is attached to one of the secondary battery assemblies. Therefore, as shown in FIG. 25, in the secondary battery assembly, a plurality of bosses 142 for screw clamps are projected on the upper surface of the top cover 20. The control board 140 is fixed to the boss 142 by screws, and supported on the top cover 20. Moreover, a shunt 144 is screwed to the boss 142 and supported on the top cover 20.

The control board 140 is commonly connected to two or more secondary battery assemblies. The control board 140 performs to detect residual electric power, a battery operation state, and unusual operation, etc. of each second battery assembly. Moreover, the control board 140 functions as a current breaker.

On the other hand, the side of the case 10 is provided with a plurality of bosses 146 which can attach other assemblies.

In addition, other structures of the secondary battery assembly are the same as those of the secondary battery assembly mentioned above.

Next, how to assemble the secondary battery assembly constituted as mentioned above is explained.

First, three components to constitute the case 10, i.e., the center case 14, the upper case 18, and the lower case 16 are prepared. Thereby, the case components can be easily formed by fabricating three case components independently. Since the center case 14 is a frame form in which the upper and lower sides open wide, the frame can be extracted from a metallic mold in both up-and-down directions in the molding process. Therefore, a chamber depth of each metallic mold can be made shallow, and an extracting angle of an internal surface of the chamber can be also made small. Accordingly, an angle of inclination of the external surface of the center case 14 formed is made small, and it becomes possible to make the width of the case small, which results in a miniaturization of the battery assembly.

Next, the bus bars and the bus bar units are equipped in the corresponding bus bar equipment rooms of the upper case 18 beforehand. The bus bars can be held easily in a predetermined position by fitting the bending portion 84 to the support ribs 66 and 67 of the respective bus bar equipment rooms. Moreover, when equipping each bus bar, the right direction can be easily judged because the form of the edges of the bus bars is different between the anode opening side and the cathode opening side. Therefore, an incorrect assembly can be also prevented.

The FPC 98 is stuck on each of the blocking boards 90a and 90b of the upper case 18, and the wirings 99a and 99b of each FPC are connected to the corresponding bus bars by soldering etc. Moreover, the thermistors 102a and 102b are temporarily fixed on each FPC 98. After laying holding members, such as sponge, on each bus bar, the top cover 20 is put on the upper case 18 from a top, and temporarily fixed on the upper case 18. Furthermore, adhesives are applied to the peripheral portion of each engaging slot 54 formed in the inside of the upper case 18 to fix the cells 12 in advance. Thereby, the upper case assembly is constituted. On the other hand, the adhesives are also applied to the peripheral portion of each engaging slot 38 formed in the inside of the lower case 16 in advance.

Figure 26:
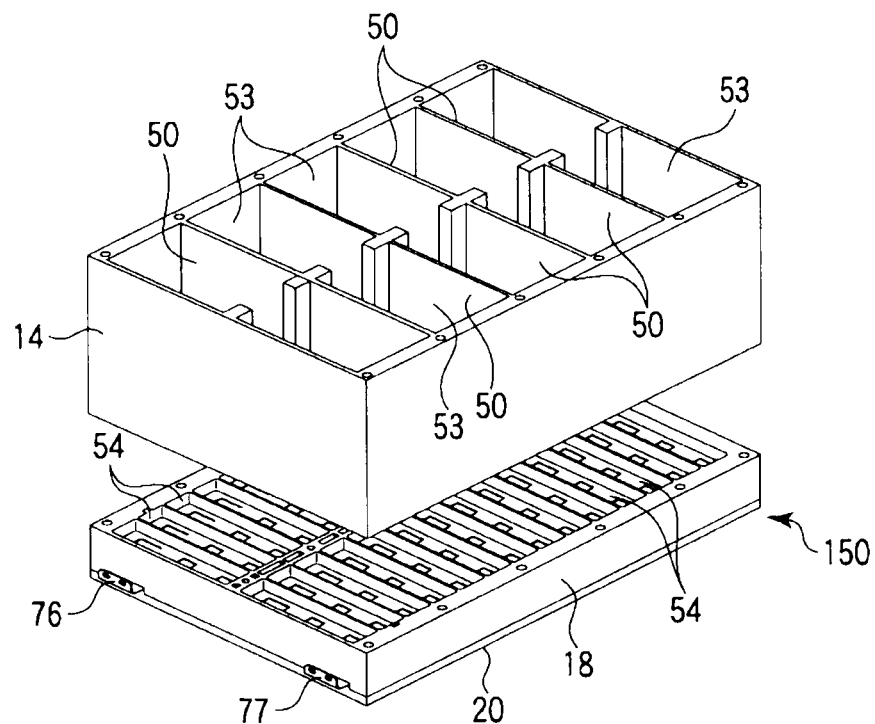
FIG. 26 is an exploded perspective view showing a fabrication process of the secondary battery assembly.

Then, as shown in FIG. 26, the upper case assembly is arranged so that the inside is turned upwards. Furthermore, the center case 14 is laid on the upper case 18 and fixed temporarily.

Figure 27:
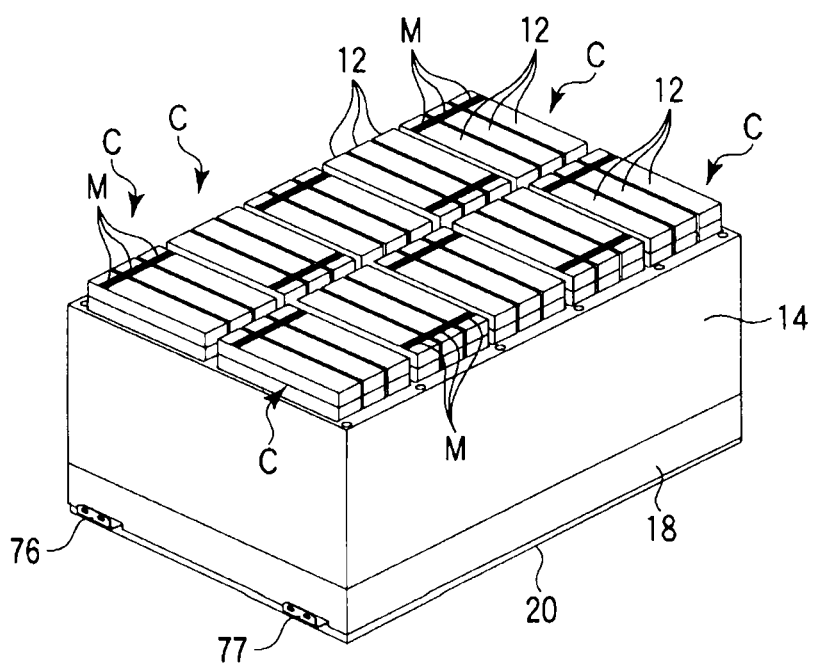
FIG. 27 is a perspective view showing a state where the case is equipped with the cell units in the fabrication process of the secondary battery assembly.

Subsequently, as shown in FIG. 27, the accommodation rooms 53 of the center case 14 is loaded with ten cell units C from the upper portion of the center case 14. Then, the upper end of the exterior container 30 of each cell 12, i.e., the end in which the electrode terminals are prepared, is fitted into the respective engaging slots 54 of the upper case 18, and fixed to the upper case 18 with the adhesives applied beforehand. A mark M which shows the anode side is given to the bottom of the exterior container 30 of each cell 12 so that the sides of the anode and the cathode are distinguished. In each cell unit C, the cells are arranged so that the marks M of the three cells 12 are lined, and ten cell units C are arranged so that the anode and the cathode sides of the each cell are located in a line by turn.

The anode terminal 32a and the cathode terminal 32b of each cell 12 are fitted to the anode opening 82a and the cathode opening 82b of the corresponding bus bars, respectively through the apertures 56a and 56b of the upper case 18, by loading each cell unit C in the center case 14 and the upper case 18. Each cell 12 is equipped in the center case 14 and the upper case 18 from a top while placing the electrode terminals upside down as mentioned above. Accordingly, even if the cells 12 vary in height, the cells 12 can be equipped in the engaging slot 54 while the respective electrode terminal sides of the cells are arranged in a line without irregularity. Consequently, each electrode terminal is certainly fixed to the bus bar.

Figure 28:
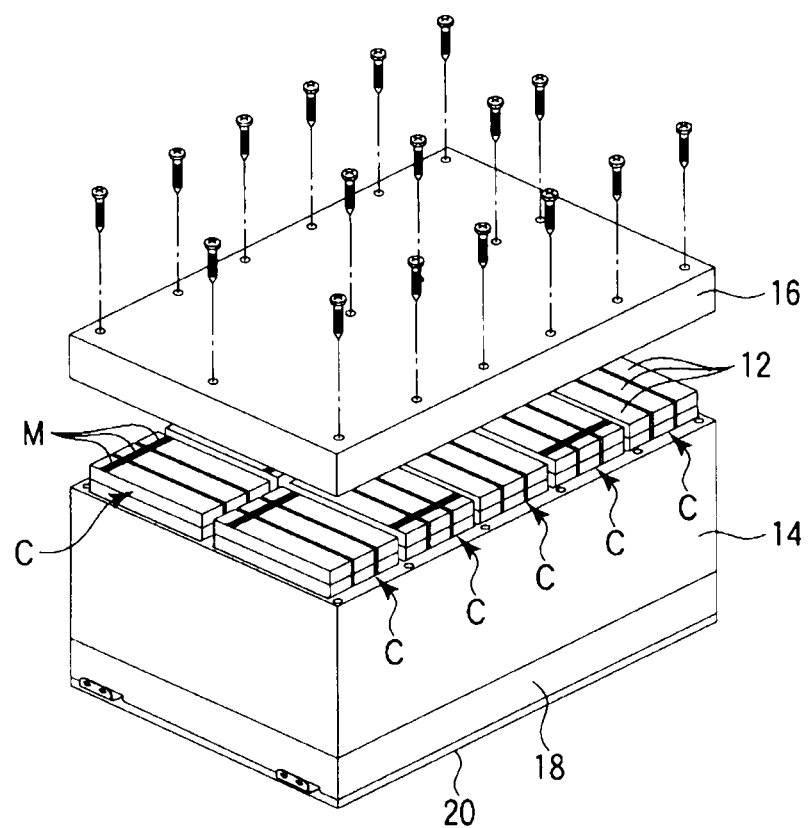
FIG. 28 is an exploded perspective view showing an attachment process of the lower case in the fabrication process of the secondary battery assembly.

Then, as shown in FIG. 28, the lower case 16 is put on the center case 14 from a top, and fixed by a plurality of screws to the center case 14. Thereby, the respective bottom ends of the cells 12 are fitted to the engaging slots 38 formed in the inside of the lower case 16, and fixed to the lower case 16 by adhesives applied beforehand.

Figure 29:
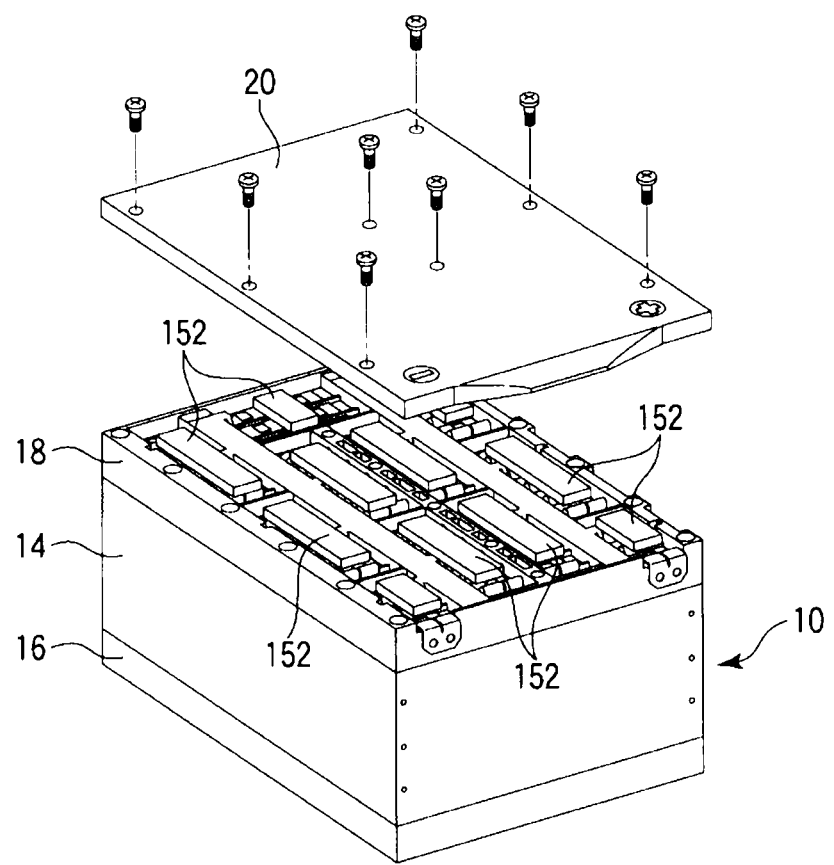
FIG. 29 is an exploded perspective view showing a state in which the top cover is removed in the fabrication process of the secondary battery assembly.

Next, as shown in FIG. 29, after reversing the case 10, the top cover 20 which was fixed temporarily is removed. Then, the holding elements 152 which has been pressed down the bus bar are also removed.

Figure 30:
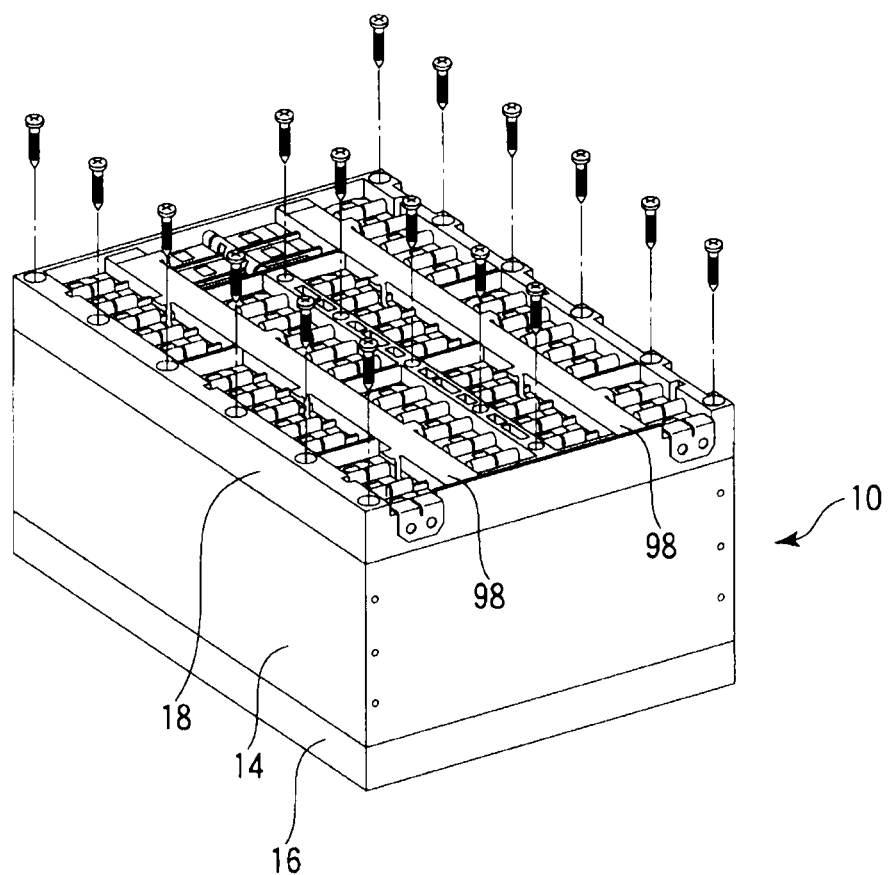
FIG. 30 is a perspective view showing an attachment process of the upper case in the fabrication process of the secondary battery assembly.

Subsequently, as shown in FIG. 30, the upper case 18 is fixed to the center case 14 with a plurality of screws. Then the anode terminal 32a and the cathode terminal 32b of the cell 12 are welded to each bus bar. Moreover, the detecting portions of the thermistors 102a and 102b which were temporarily fixed are pressed in the guide slots 104a and 104b of the upper case 18 and the center case 14, respectively, and pressed welding to the predetermined cell 12.

Figure 21:
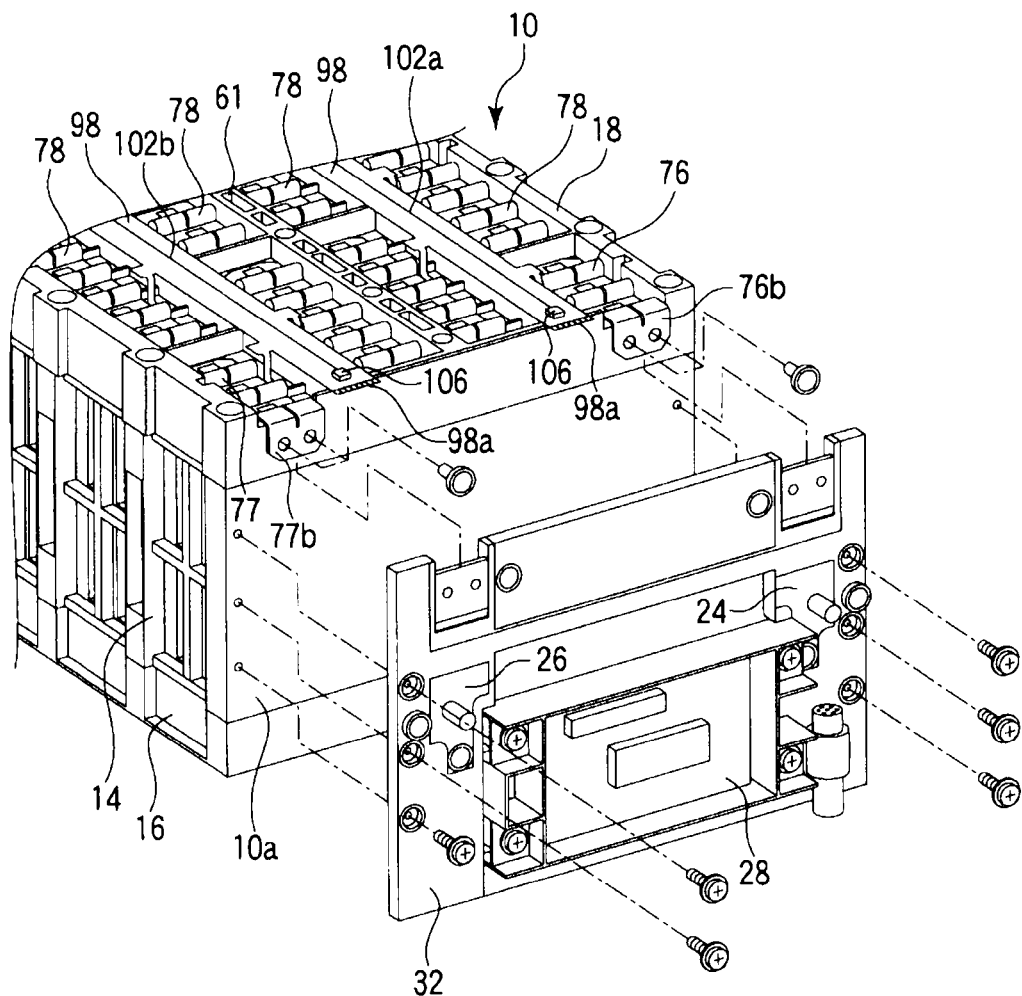
FIG. 21 is an exploded perspective view showing a front end and a base terminal of the case.
Figure 22:
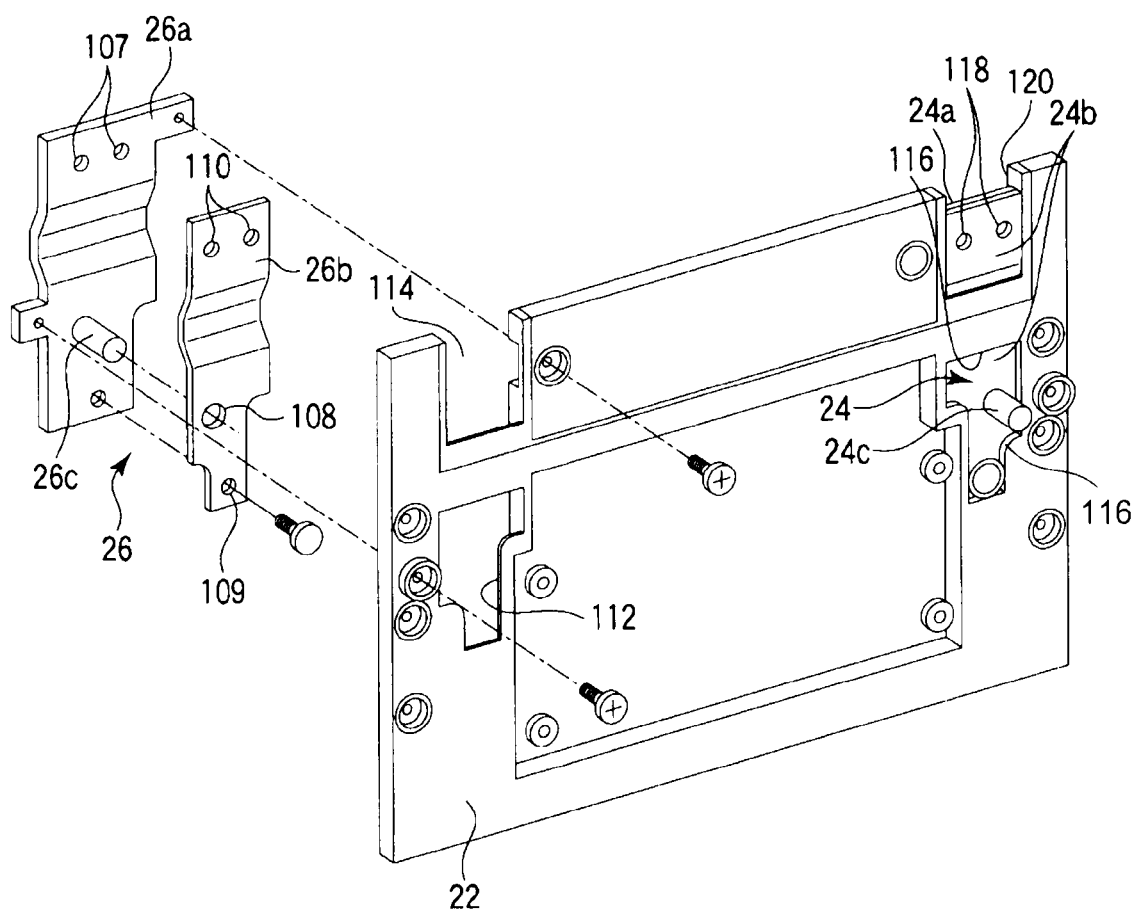
FIG. 22 is an exploded perspective view showing the base terminal and output terminals.

On the other hand, as shown in FIG. 2, and FIG. 21, the anode output terminal 24 and the cathode output terminal 26 are fixed to the terminal base 22, and the battery checking board 28 is screwed at the terminal base 22. Subsequently, after fixing the terminal base 22 to the front side of the case 10 by screws, the anode output terminal 24 and the cathode output terminal 26 are respectively fixed at the anode side output end 76b of the anode bus bar 76 and the cathode side output end 77b of the cathode bus bar 77 by screws. Moreover, the FPC 98 and the thermistors 102a and 120b are connected to the battery checking board 28. Finally, the top cover 20 is put on the upper case 18, and screwed at the upper case. Finally, the secondary battery assembly is completed.

According to the embodiment, the number of the cells which constitute a cell unit is not limited to three, but two or four, or more may be used. Moreover, the number of cell units installed in a secondary battery assembly can be changed not only ten but if needed. The anode terminal and the cathode terminal of each cell may be other forms, such as square pillar form and circular pillar form etc. The form and the material of the bus bar and the case can be suitably changed not only in the embodiment described above.

According to the embodiments of the invention, the components and the case can be easily assembled because a hard packaging structure is not needed. Therefore, miniaturization of the secondary battery assembly can be attained. Further, the packaging density of the cells can be improved, which results in increase in the cell loading amount of per unit volume.

While certain embodiments have been described, the embodiments have been presented by way of example only, and are not intended to limit the scope of the inventions. In practice, the structural elements can be modified without departing from the spirit of the invention. Various embodiments can be made by properly combining the structural elements disclosed in the embodiments. For example, some structural elements may be omitted from all the structural elements disclosed in the embodiments. Furthermore, structural elements in different embodiments may properly be combined. The accompanying claims and their equivalents are intended to cover such forms or modifications as would fall with the scope and spirit of the inventions.

What is claimed is:

1. A secondary battery assembly, comprising:
   a plurality of battery cells;
   a case, including a first predetermined number of spaces arranged in a first row and the first number of spaces arranged in a second row formed in parallel to the first row, for accommodating a plurality of cell units including a second predetermined number of battery cells;
   a first bus bar, placed on a plate of the case and facing electrodes of the battery cells, for connecting first electrodes of a first cell unit in the first row and second electrodes of a second cell unit in the first row, wherein the second cell unit is placed adjacent to the first cell unit, the first bus bar including openings for the first electrodes and the second electrodes and first bending portions formed between the openings and protruding outwardly from the case to reduce load applied to the battery cells when the first bus bar is attached;
   a second bus bar, placed on the plate, for connecting first electrodes of the second cell unit in the first row and second electrodes of a third cell unit in the first row in parallel with the first bus bar, wherein the third cell unit is placed adjacent to the second cell unit on an other side of the first cell unit, the second bus bar including openings for the first electrodes and the second electrodes and the same bending portions as the first bending portions formed between the openings and protruding outwardly from the case to reduce load applied to the battery cells when the second bus bar is attached;
   a third bus bar, placed on the plate, for connecting second electrodes of the first cell unit in the first row and first electrodes of a fourth cell unit in the second row in a direction perpendicular to both of the first bus bar and the second bus bar, wherein the fourth cell unit is placed adjacent to the first cell unit, the third bus bar including openings for the second electrodes and the first electrodes and second bending portions formed between the openings and protruding outwardly from the case to reduce load applied to the battery cells; and
   a plurality of exhaust apertures formed in the plate between the first electrode and the second electrode of the battery cells and facing a plurality of safety valves formed on the battery cells.

2. The secondary battery assembly according to claim 1, wherein
   the case includes a lower case constituting a bottom wall, an upper case provided to face the lower case constituting a ceiling wall, and a frame-like center case joined between the lower case and the upper case,
   the plurality of battery cells are arranged in a line in the case,
   an anode output terminal and a cathode output terminal are provided in a first side wall of the case,
   the upper case includes a plurality of partitioned bus bar equipment rooms formed at an outer surface of the upper case, and a plurality of openings formed in the respective bus bar equipment rooms, and
   the first, second, third, and fourth bus bars are accommodated in the bus bar equipment rooms.

3. The secondary battery assembly according to claim 1, wherein
   the plurality of battery cells are arranged to face each other with a gap therebetween, and the case includes a pair of side walls arranged in both sides of the cell units and a vent formed in the respective side walls corresponding to the gap between the secondary battery cells.

4. The secondary battery assembly according to claim 2, further comprising a flexible printing circuit board fixed on the upper case and extending in each line of the cell units, wherein the flexible printing circuit board includes a plurality of wirings electrically connected to the respective bus bars.

5. The secondary battery assembly according to claim 4, further comprising a tabular terminal base in which the anode output terminal and the cathode output terminal are fixed.

6. The secondary battery assembly according to claim 5, wherein the respective anode output terminal and cathode output terminal include a terminal base element having a connecting portion and fixed to the terminal base element, and an electric conduction terminal fixed to the terminal base element in a stacked arrangement.

7. The secondary battery assembly according to claim 4, further comprising a battery checking board to check a voltage of the cell units, and the flexible printing circuit board is electrically connected to the battery checking board.

8. The secondary battery assembly according to claim 7, further comprising a thermistor fixed to the upper case to detect temperature of the battery cells,
   wherein a detecting portion of the thermistor is pressed in guide grooves formed in inner surfaces of the upper case and the center case and welded to the side of the cell by pressure, and
   wherein the thermistor is electrically connected to the battery checking board.

9. The secondary battery assembly according to claim 1, wherein the first and second bending portions each include a slit between adjacent openings.

* * * * *